(12) United States Patent
Romain

(10) Patent No.: US 10,356,230 B2
(45) Date of Patent: *Jul. 16, 2019

(54) BATTERY REPLACEMENT TECHNIQUES AND ENHANCEMENT FEATURES FOR A MOBILE COMPUTING DEVICE

(71) Applicant: Joseph Romain, Providence, RI (US)

(72) Inventor: Joseph Romain, Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/456,495

(22) Filed: Mar. 11, 2017

(65) Prior Publication Data

US 2017/0208159 A1 Jul. 20, 2017

Related U.S. Application Data

(63) Continuation-in-part of application No. 14/944,751, filed on Nov. 18, 2015, now Pat. No. 9,967,377.

(Continued)

(51) Int. Cl.
*H04M 1/00* (2006.01)
*H04M 1/02* (2006.01)
*H04W 4/14* (2009.01)

(52) U.S. Cl.
CPC .......... *H04M 1/0262* (2013.01); *H04W 4/14* (2013.01); *H04M 2001/0204* (2013.01);

(Continued)

(58) Field of Classification Search
CPC ....... H04W 64/00; H04W 4/02; H04W 4/021; H04W 4/028; H04M 1/0262;

(Continued)

(56) References Cited

U.S. PATENT DOCUMENTS 5,786,106 A 7/1998 Armani
5,973,476 A * 10/1999 Irvin ..................... H02J 7/0024
307/150

(Continued)

FOREIGN PATENT DOCUMENTS

FR 2960362 A3 * 11/2011 ............. A45C 11/00
FR 2960362 A3 * 11/2011 ............. A45C 11/00

(Continued)

OTHER PUBLICATIONS

LG G5 Unlocked in Silver, RS988 Silver, 3 pages, available at http://www.lg.com/us/cell-phones/lg-RS988-Silver-g5-unlocked, last accessed May 17, 2017.

(Continued)

*Primary Examiner* — Mahendra Patel
(74) *Attorney, Agent, or Firm* — Hayes Soloway PC

(57) ABSTRACT

Battery replacement techniques and enhancement features for a mobile computing device are disclosed. In accordance with some embodiments, the disclosed techniques may be implemented in structural device features that provide for easily and rapidly accessing and removing a battery from a mobile computing device. The disclosed techniques may be used, for example, in replacing a depleted mobile phone battery efficiently with an energized replacement battery. Various enhancement features also may be implemented, facilitating operation of the mobile computing device by the user. Numerous configurations and variations will be apparent in light of this disclosure.

19 Claims, 20 Drawing Sheets

Related U.S. Application Data

(60) Provisional application No. 62/135,241, filed on Mar. 19, 2015.

(52) U.S. Cl.
CPC ............ *Y02D 70/00* (2018.01); *Y02D 70/164* (2018.01); *Y02D 70/166* (2018.01)

(58) Field of Classification Search
CPC ......... H04M 2001/0204; H04B 1/3883; H04B 7/18595; Y02D 70/00; Y02D 70/164; Y02D 70/166; G06F 1/1632; G06F 1/26; G06F 15/16; G01S 5/0027; H04L 51/00
USPC ................. 455/572, 573, 557, 556.2, 575.1; 713/300; 370/338
See application file for complete search history.

(56) References Cited

U.S. PATENT DOCUMENTS

| | | | |
|---|---|---|---|
| D472,549 S | 4/2003 | Nuovo et al. | |
| 7,251,471 B2 | 7/2007 | Boling et al. | |
| 7,539,521 B2 * | 5/2009 | Nam .................... | H01M 2/1022 292/163 |
| 8,234,509 B2 * | 7/2012 | Gioscia ................. | G06F 1/1632 713/300 |
| 8,958,849 B2 | 2/2015 | Aldossary | |
| 2002/0039910 A1 | 4/2002 | Malthouse | |
| 2002/0147035 A1 * | 10/2002 | Su ........................ | H04B 1/3877 455/572 |
| 2004/0224556 A1 * | 11/2004 | Qin ...................... | H01M 2/1066 439/500 |
| 2005/0055407 A1 * | 3/2005 | Tandler .............. | H04B 7/18595 709/206 |
| 2005/0191970 A1 | 9/2005 | Hasegawa | |
| 2007/0010219 A1 * | 1/2007 | Qin ...................... | H04B 1/3883 455/128 |
| 2007/0194123 A1 * | 8/2007 | Frantz ................ | G06K 17/0022 235/462.45 |
| 2009/0051223 A1 * | 2/2009 | Woo ...................... | H02J 7/0013 307/80 |
| 2009/0163247 A1 * | 6/2009 | Song .................... | H04M 1/0235 455/566 |
| 2010/0008031 A1 * | 1/2010 | Reifman ............... | G06F 1/1626 361/679.3 |
| 2010/0086840 A1 * | 4/2010 | Shao .................... | H01M 2/1061 429/97 |
| 2010/0160002 A1 * | 6/2010 | Oh ....................... | H04M 1/0256 455/573 |
| 2011/0009172 A1 * | 1/2011 | Song ................. | H04M 1/72544 455/573 |
| 2011/0039605 A1 * | 2/2011 | Choi ..................... | H02J 7/0047 455/573 |
| 2011/0183174 A1 * | 7/2011 | Ouyang .............. | H01M 2/1066 429/97 |
| 2011/0287726 A1 * | 11/2011 | Huang ................. | H04B 1/3883 455/90.3 |
| 2012/0254479 A1 * | 10/2012 | Matsuoka ............. | G06F 1/1635 710/16 |
| 2013/0260825 A1 * | 10/2013 | Hagenstad .......... | H04M 1/0202 455/556.1 |
| 2014/0099805 A1 * | 4/2014 | Kutchery ............. | H04B 1/3816 439/76.1 |
| 2014/0340020 A1 * | 11/2014 | Kang .................. | H01M 10/465 320/101 |

FOREIGN PATENT DOCUMENTS

| | | | | |
|---|---|---|---|---|
| GB | 2488279 B | * | 9/2016 | .......... G06F 1/1632 |
| KR | 20060014949 A | | 2/2006 | |
| WO | WO 9515619 A1 | * | 6/1995 | .......... H04B 1/3883 |
| WO | WO-9515619 A1 | * | 6/1995 | .......... H04B 1/3883 |
| WO | 01/73960 A1 | | 10/2001 | |
| WO | WO 2011063033 A2 | * | 5/2011 | .......... G06F 1/1632 |
| WO | WO 2011107298 A2 | * | 9/2011 | .......... H02J 7/0003 |

OTHER PUBLICATIONS

PCT International Search Report received in PCT Application No. US2018/021770, dated May 21, 2018, 3 pages.
PCT Written Opinion of the International Searching Authority received in PCT Application No. US2018/021770, dated May 21, 2018, 8 pages.

* cited by examiner

BATTERY REPLACEMENT TECHNIQUES AND ENHANCEMENT FEATURES FOR A MOBILE COMPUTING DEVICE

CROSS-REFERENCE TO RELATED APPLICATIONS

This patent application is a Continuation-in-Part of U.S. patent application Ser. No. 14/944,751, filed on Nov. 18, 2015, which claims the benefit of U.S. Provisional Patent Application No. 62/135,241, filed on Mar. 19, 2015. Each of these applications is herein incorporated by reference in its entirety.

FIELD OF THE DISCLOSURE

The present disclosure relates to mobile computing devices and more particularly to mobile phones.

BACKGROUND

In today's world, almost none of us can truly escape the need for the use of a smart-phone or the like device. Today's cell phones are quite sophisticated compared to what we used to have a couple of decades ago. They are built to multitask and can sometimes do more than we need them for. However, despite all the glamour and sophistication, there is still a primitive side of the cell phone that we are all quite familiar with, that we seem to forget about, which needs an improvement and some level of sophistication, too, and that's the battery and its associated recharging and replacement processes.

Nowadays, there is a need to always have to charge and recharge the phone many times throughout the day to keep up with ongoing demands. Presently, there are only two options available. If you have a built-in battery phone, like an iPhone, your only option is to recharge by plugging it in. However, the re-charging takes time, which is not necessarily readily available. If you have a removable battery phone, like a Samsung, you can take the next step of taking the phone apart to remove and replace the battery with a charged one, but over time, you are certainly going to end up messing up your phone through that process of trying to properly remove the battery itself. Today, we are in a war against time itself, life has become a battlefield in which we are trapped, and to survive is to be prepared and to be ready to load and unload very quickly.

Therefore, a main object of the present invention is to provide an improved device for making it easier to replace a battery in a cell phone of virtually any type. It's not the reinvention of the phone, but simply a very important improvement which will revolutionized the industry and will change the way we use phones for generations to come.

SUMMARY

To accomplish the foregoing and other objects, features and advantages of the present invention, there is the solution to replace the drained battery with a charged one, in a more efficient way. The present invention provides for an improvement whereby the mobile computing device battery can be removed much easier and be replaced without having to cause any damage to the basic mobile computing device unit. To do that, there is an opening on the side of the device where one would eject the drained battery out to slide the charged one in, just a little push would release it, ejected to be removed, and as long as one keeps up with a charged one close by, the exchange occurs easily every time. Dealing with a dead battery would simply become a thing of the past. To make it even easier, the present invention goes one step further to make the mobile computing device with a small permanent battery built in to hold some charge, to keep the mobile computing device "ON" throughout the battery replacement process.

In accordance with one version of the present invention there is provided a mechanism for replacing a battery in a housing of a mobile computing device, wherein the housing has a sidewall with a slot for receiving the battery and further including a docking pad within the housing disposed within a space defined by the housing. The docking pad provides a locking of the battery in place when the battery is pressed into the slot to contact the docking pad. The battery is removable by pressing the battery inward in order to release the docking pad and enable the battery to be manually withdrawn from the housing of the mobile computing device.

In accordance with other aspects of the present invention including a spring at the docking pad to assist in releasing the battery; including a locking surface of the docking pad that holds the battery in place once inserted into the housing; wherein the spring is activated by pressing again on the battery; wherein the housing and the battery are both of rectangular shape; including a separate battery disposed within the housing; including an electrical circuit for interconnecting the replaceable battery and the separate battery; wherein the electrical circuit is a parallel circuit in which the respective replaceable battery and the separate battery are arranged in a parallel circuit; and wherein the mobile computing device has an electrical input to which the electrical circuit connects.

En accordance with another version of the present invention there is provided an apparatus for replacing a battery in a housing of a mobile computing device, wherein the housing has a sidewall with a slot for receiving the battery and further including a docking pad within the housing disposed within a space defined by the housing. The docking pad provides a locking of the battery in place when the battery is pressed into the slot to contact the docking pad. A release button is accessible on the mobile computing device housing, including a coupling element to connect the release button to the docking pad. The release button is manually actuatable to release the docking pad.

In accordance with other aspects of the present invention including a spring at the locking to assist in releasing the battery; including a locking surface of the docking pad that holds the battery in place once inserted into the housing; wherein the spring is activated by manually pressing the release button; wherein the housing and the battery are both of rectangular shape; including a separate battery disposed within the housing; including an electrical circuit for interconnecting the replaceable battery and the separate battery; wherein the electrical circuit is a parallel circuit in which the respective replaceable battery and the separate battery are arranged in a parallel circuit; and wherein the mobile computing device has an electrical input to which the electrical circuit connects.

In accordance with still another version of the present invention there is provided a method for replacing a battery in a housing of a mobile computing device, including providing the housing having a sidewall with a slot in the sidewall for receiving the battery, including providing a docking pad within the housing disposed within a space defined by the housing, locking the battery in place in the housing when the battery is fully inserted, and releasing the battery by means of one of providing a separate release button for unlocking the battery, and pressing the battery inward in order to release the battery. The method may also include providing a separate battery and a parallel electrical circuit for interconnecting the replaceable battery and the separate battery, a removal of the replaceable battery leaving electrical power to the mobile computing device by virtue of the connection of the parallel arrangement of the separate battery.

The subject matter of this application may involve, in some cases, interrelated products, alternative solutions to a particular problem, and/or a plurality of different uses of a single system or article.

One example embodiment includes a mobile computing device including: an outer housing; a first battery disposed within the outer housing; a battery compartment disposed at least one of on and within the outer housing and configured to receive a second battery; electronics disposed within the outer housing and configured to provide electrical coupling of the first battery and the second battery in parallel such that, upon removal of the second battery from the battery compartment, the mobile computing device draws power from the first battery; and a battery replacement mechanism configured to provide for removal of the second battery from the battery compartment. In some cases, the battery replacement mechanism includes: a locking mechanism configured to engage and retain the second battery within the battery compartment; and a biasing mechanism including at least one of a compression spring arm, a helical coil spring, and a compression piston, wherein the biasing mechanism is configured to bias the second battery against the locking mechanism within the battery compartment such that at least one of: when the locking mechanism is engaged, the second battery is prevented from moving within the battery compartment in at least one of a horizontal manner and a vertical manner; and when the locking mechanism is disengaged from the second battery, the biasing mechanism assists in ejecting the second battery from the battery compartment. In some instances: the outer housing includes an opening defined in a side thereof; and the battery replacement mechanism includes a tray configured to receive and retain the second battery and to be inserted through the opening such that the second battery resides within the battery compartment. In some cases: the battery replacement mechanism includes a base portion of the outer housing configured to be operatively coupled to a remainder of the outer housing; and in removing the base portion from the remainder of the outer housing, the battery compartment is exposed. In some such cases, the base portion is configured to receive and retain the second battery such that in removing the base portion from the remainder of the outer housing, the second battery is removed from the battery compaitment in tandem. In some other such cases, the battery replacement mechanism further includes a tether configured to operatively couple the base portion to the remainder of the outer housing. In some instances, the battery replacement mechanism includes a base portion of the outer housing configured to be operatively coupled to a remainder of the outer housing via a hinge configured to permit the base portion to flip away from the remainder of the outer housing so as to expose the battery compartment. In some cases, the outer housing is configured to permit the second battery to be mounted on the outer housing and to at least one of slide into the battery compartment and snap onto the battery compartment. In some instances, the mobile computing device further includes an emergency distress call (EDC) button configured to call an emergency services provider upon activation of the button and at least one of turn on a global positioning system (GPS) element and alert a contact, wherein the EDC button is accessible from an exterior of the outer housing. In some such instances, the mobile computing device further includes a safety guard disposed over the EDC button and configured to prevent unintentional activation of the EDC button. In some cases, the mobile computing device further includes a button configured to disable and enable short message service (SMS) capabilities of the mobile computing device upon activation of the button, wherein the button is accessible from an exterior of the outer housing. In some such cases, the mobile computing device is further configured such that at least one of: when SMS capabilities are disabled and the mobile computing device receives SMS data from a remote source, the mobile computing device automatically transmits SMS data to the remote source indicating that at least one of SMS capabilities are currently disabled and a user of the mobile computing device is currently unavailable for reply; and times during which SMS capabilities are disabled are logged. In some instances, the mobile computing device further includes a button configured to access a camera of the mobile computing device immediately upon activation of the button and capture image data immediately upon activation, wherein the button is accessible from an exterior of the outer housing. In some cases, the mobile computing device further includes a media slot accessible from an exterior of the outer housing, wherein the media slot is configured to receive and retain at least one of a subscriber identity module (SIM) card and a secure digital (SD) memory card. In some instances, the mobile computing device further includes at least one of: a barcode scanner device disposed at an end of the outer housing; and a payment scanner device disposed on a back of the outer housing. In some cases, the mobile computing device further includes a light output device disposed at an end of the outer housing and configured to cast light out from the end of the outer housing in a direction along a length of the outer housing, wherein the light output device includes at least one light-emitting diode (LED). In some instances, the mobile computing device further includes a photovoltaic cell configured to be electrically coupled with the electronics to provide for at least one of: electrical charging of the first battery; electrical charging of the second battery; and electrical powering of the mobile computing device directly. In some cases, the mobile computing device further includes an input port disposed at an end of the outer housing and configured to interface with at least one of a charging cable and a data transfer cable via a bayonet-style connection. In some instances, a system is provided, the system including: the mobile computing device described herein; and a case including a retainer portion configured to receive and retain the second battery, wherein the case is configured to be interfaced with the outer housing of the mobile computing device such that the second battery is disposed within the battery compartment and electrically coupled with the electronics of the mobile computing device to provide for at least one of electrical charging of the first battery; electrical charging of the second battery; and electrical powering of the mobile computing device directly. In some such instances, the case further includes a photovoltaic cell configured to be electrically coupled with the electronics of the mobile computing device to provide for at least one of: electrical charging of the first battery; electrical charging of the second battery; and electrical powering of the mobile computing device directly.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
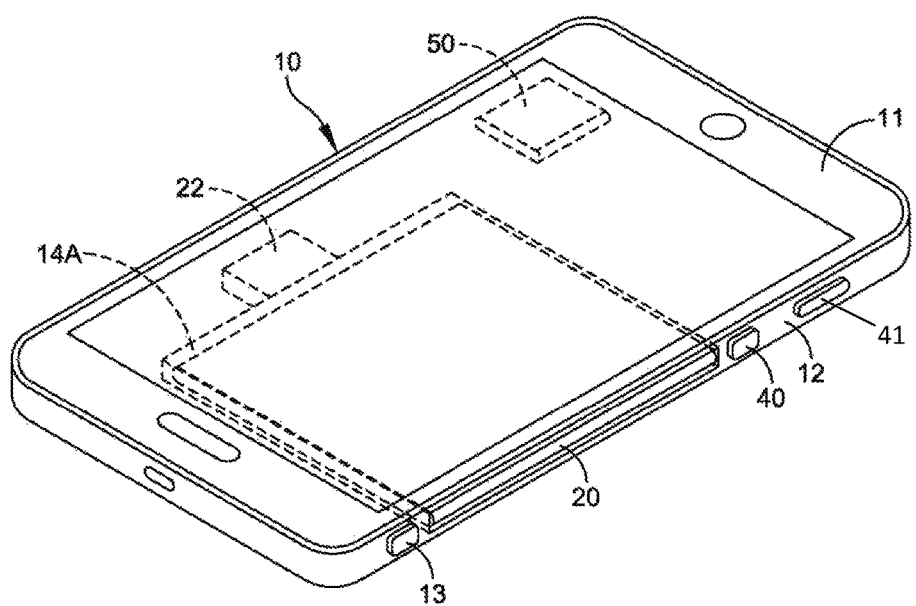
FIG. 1 is a perspective view illustrating the novel battery replacement arrangement of the present invention in association with a mobile computing device.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

Battery replacement techniques and enhancement features for a mobile computing device are disclosed. In accordance with some embodiments, the disclosed techniques may be implemented in structural device features that provide for easily and rapidly accessing and removing a battery from a mobile computing device. The disclosed techniques may be used, for example, in replacing a depleted mobile phone battery efficiently with an energized replacement battery. Various enhancement features also may be implemented, facilitating operation of the mobile computing device by the user. Numerous configurations and variations will be apparent in light of this disclosure.

General Overview

Some existing mobile computing devices, such as the Apple iPhone® mobile digital device, have an integrated battery that is not designed to be removed from the device. Such devices require direct connection to a power outlet or other power source via a cable to recharge. Some other existing mobile computing devices have a removable battery, but the host devices are not designed for easy and rapid removal. Rather, these devices must be taken apart, removing the front or back casing of the device, and only then can the expended battery be removed and replaced. After replacement, the device must be reassembled. Rapid battery depletion further complicates the matter, and frequent recharging may be required to meet demands for mobile computing and communication capabilities. Recharging or replacing the battery in either manner can take a significant amount of time, which may not be practical in some circumstances. Moreover, disassembly of the device presents a risk of damaging the device and/or the battery, as well as a risk of misplacing components.

Thus, and in accordance with some embodiments of the present disclosure, battery replacement techniques and enhancement features for a mobile computing device are disclosed. In accordance with some embodiments, the disclosed techniques may be implemented in structural device features that provide for easily and rapidly accessing and removing a battery from a mobile computing device. The disclosed techniques may be used, for example, in replacing a depleted mobile phone battery efficiently with an energized replacement battery. Various enhancement features also may be implemented, facilitating operation of the mobile computing device by the user.

System Architecture and Operation

Figure 7:
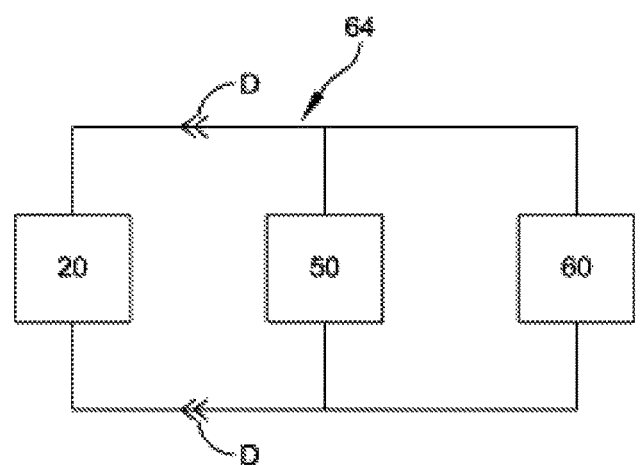
FIG. 7 is a circuit diagram illustrating the rechargeable battery as well as the permanent battery used for powering the mobile computing device.
Figure 8:
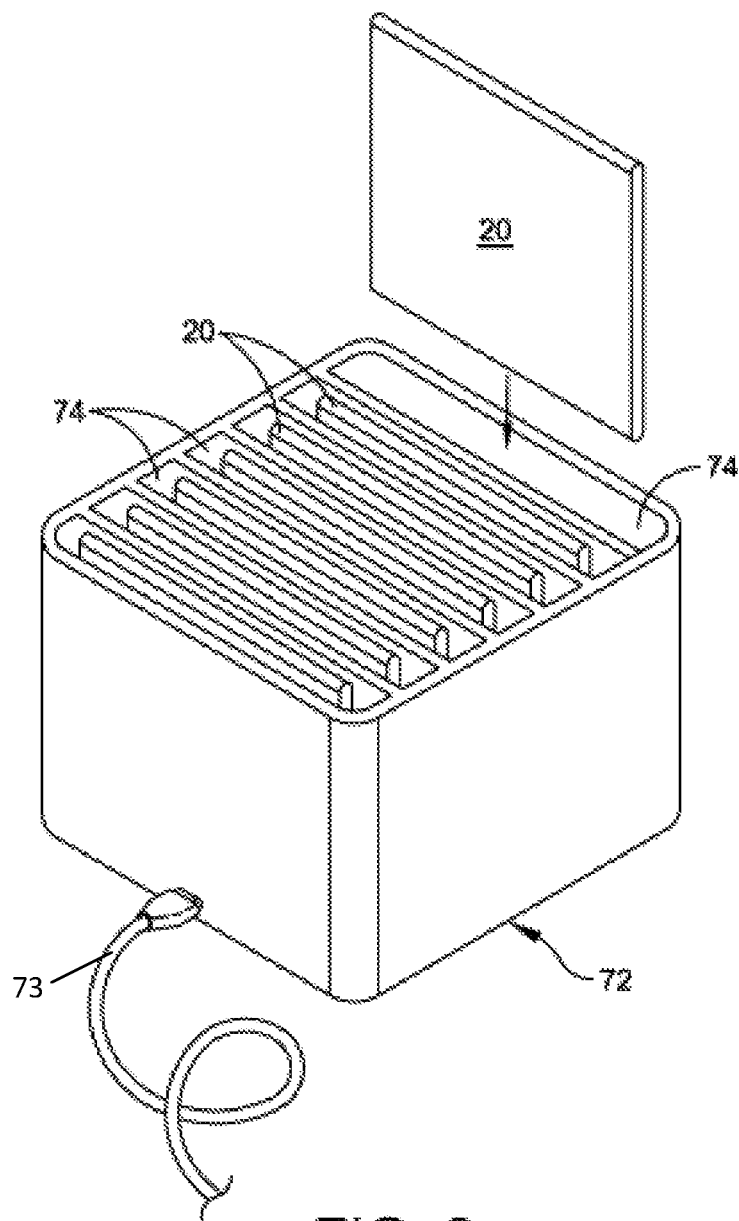
FIG. 8 is a diagram of an alternate charging apparatus.
Figure 9:
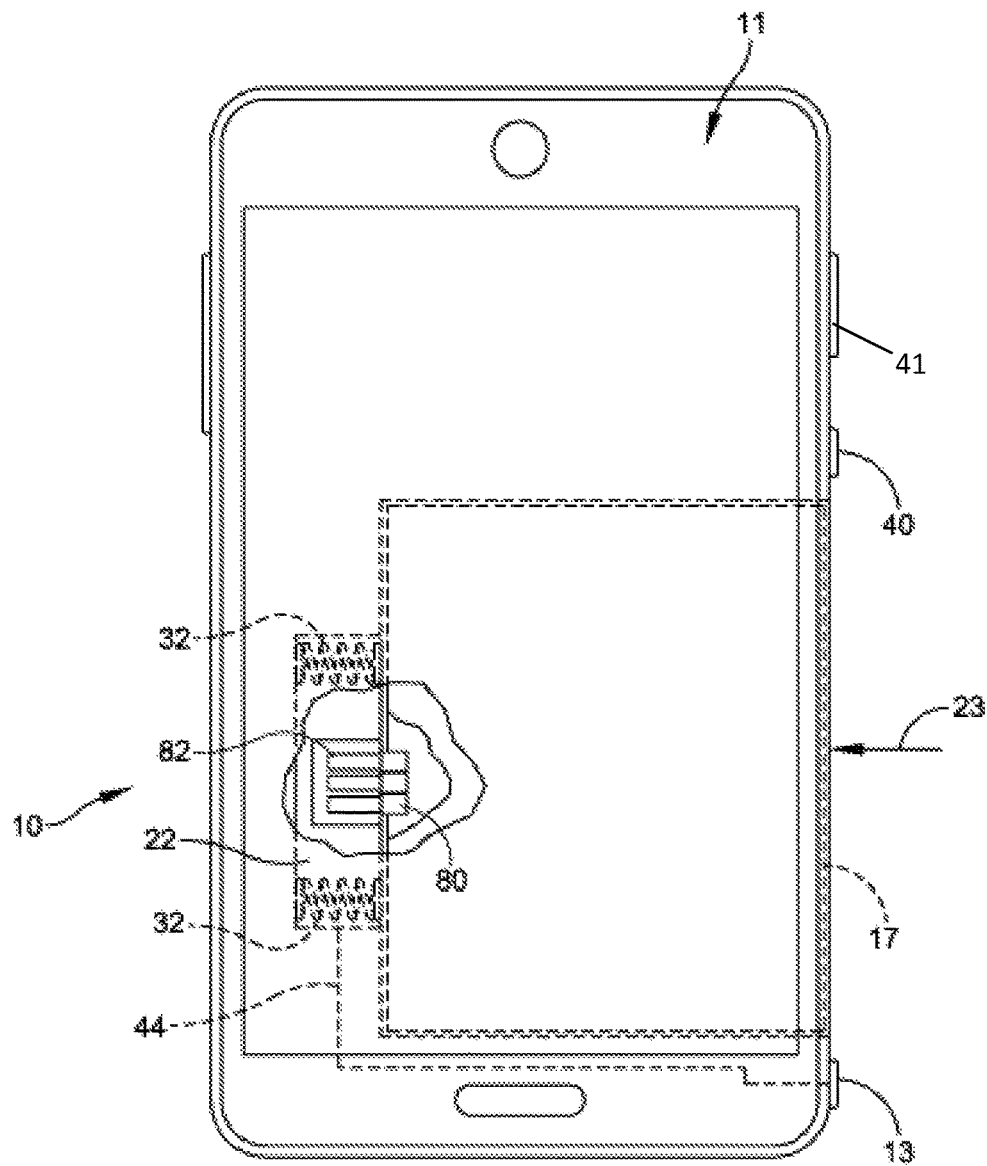
FIG. 9 is a plan view of an alternate embodiment.

Reference is now made to the drawings and, in particular, to FIGS. 1-6 that illustrate a mobile computing device 10 (e.g., cell phone) that is adapted in order to receive a battery 20 in a more accommodating manner so that the battery 20 can be readily inserted and yet also readily released from the cell phone housing 11 in order to replace the battery 20 with a previously charged battery 20. FIG. 7 is a schematic diagram illustrating a parallel circuit arrangement for connecting the rechargeable battery 20 and the permanent battery 50. FIG. 8 is a diagram of an alternate charging apparatus 72. FIG. 9 is a plan view of an alternate embodiment.

The present drawings illustrate several embodiments of the present invention. The first embodiment is described in which there is a docking pad 22 that can be used, when pressed against, as a locking mechanism while, at a later time, the battery 20 can be pushed in the direction of arrow 23 in FIG. 6 to release the battery 20, actuating a spring mechanism 32 for ejecting the battery 20. A second embodiment of the present invention employs a separate release button 13 for controlling the docking pad 22 so as to release the battery 20 from the docking pad 22. As will be appreciated in light of this disclosure, release button 13 can be disposed anywhere along outer housing 11 (e.g., on an edge), as desired. In some cases, release button 13 may be disposed adjacent power button 41.

Regarding the first embodiment that does not use a release button 13, reference is made to the drawings showing a mobile computing device 10 that includes all the normal internal structure for the proper operation thereof (e.g., as a cell phone), including an outer housing 11. The housing 11 may be provided in separate upper and lower sections. The outer housing 11 is illustrated as being provided with a sidewall 12 that is provided with an elongated slot 14 dimensioned to receive the battery 20. The elongated slot 14 extends from the sidewall surface at 12 internally to location 14A illustrated in FIG. 1. The battery 20 may be of conventional design or may be particularly configured in order to be properly received in the side elongated slot 14. The elongated slot 14 may be provided with side grooves or other guidance feature(s) for guiding the battery 20.

Figure 2:
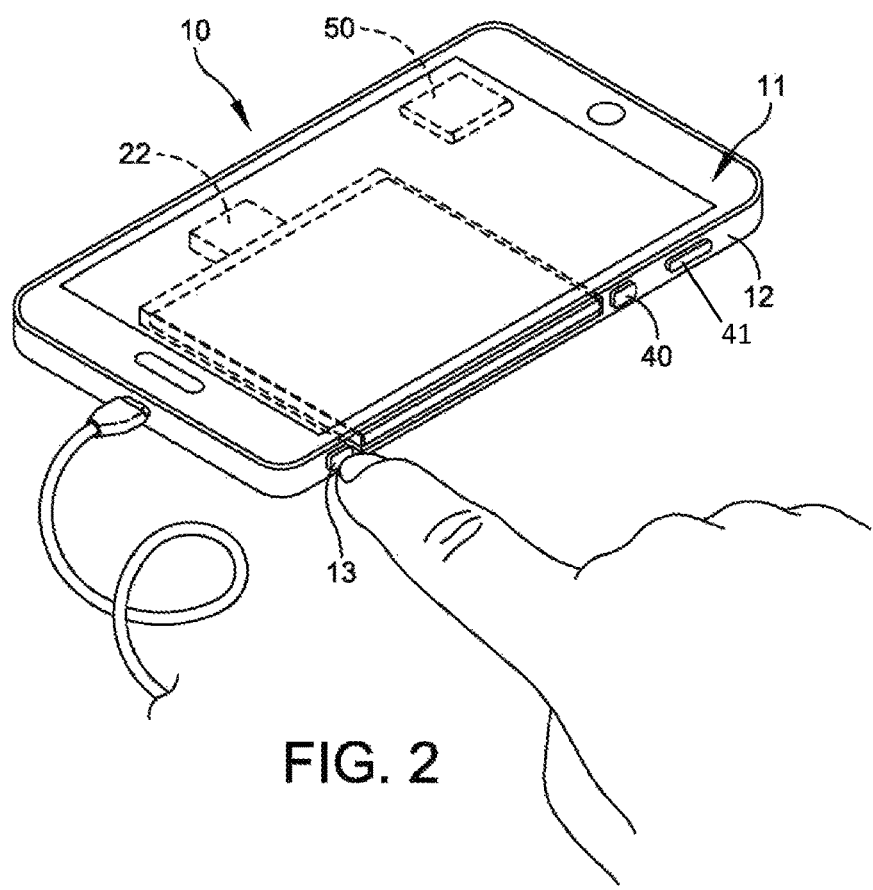
FIG. 2 is a perspective view of one embodiment of the present invention employing a separate release button for ejecting the battery.
Figure 3:
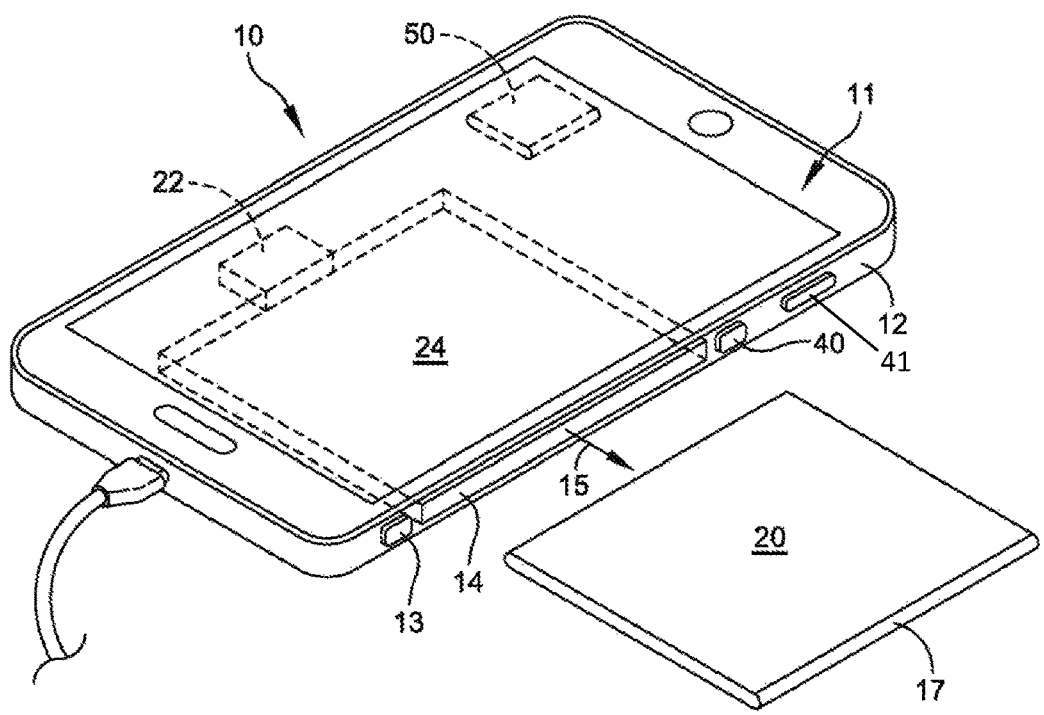
FIG. 3 is an exploded perspective view of the mobile computing device showing the battery having been removed in the direction of the arrow shown.
Figure 5:
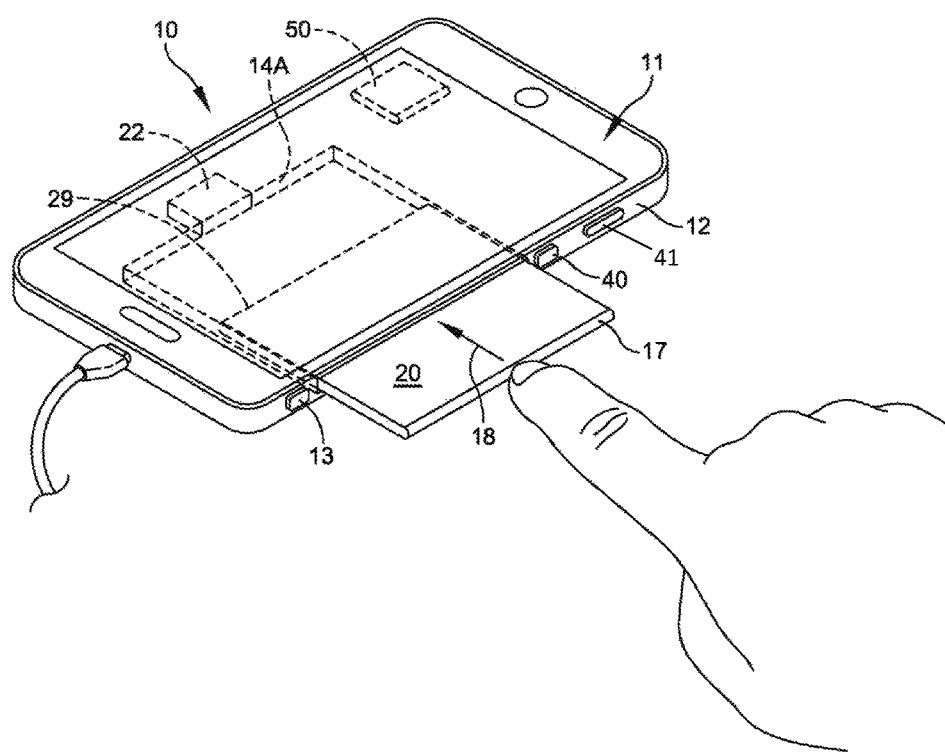
FIG. 5 is a perspective view illustrating the user inserting the battery into the slot of the mobile computing device.

At the very base of the elongated slot 14 there is located a docking pad 22 shown in phantom in FIGS. 1 and 2. This docking pad 22 may be designed so that it either holds the battery 20 in place or releases the battery 20 depending upon the action made by the user of the device 10. FIG. 3 shows the battery 20 out of the outer housing 11, but also shows the internal battery space 24. In FIG. 5, the docking pad 22 is in a position in readiness to receive the end of the battery 20 to lock the battery 20 in place. The battery 20 can then be inserted in the direction of arrow 18 until the end 29 of the battery 20 engages the docking pad 22 locking the battery 20 in place by means of the docking pad 22 being in the form of a locking mechanism.

Figure 6:
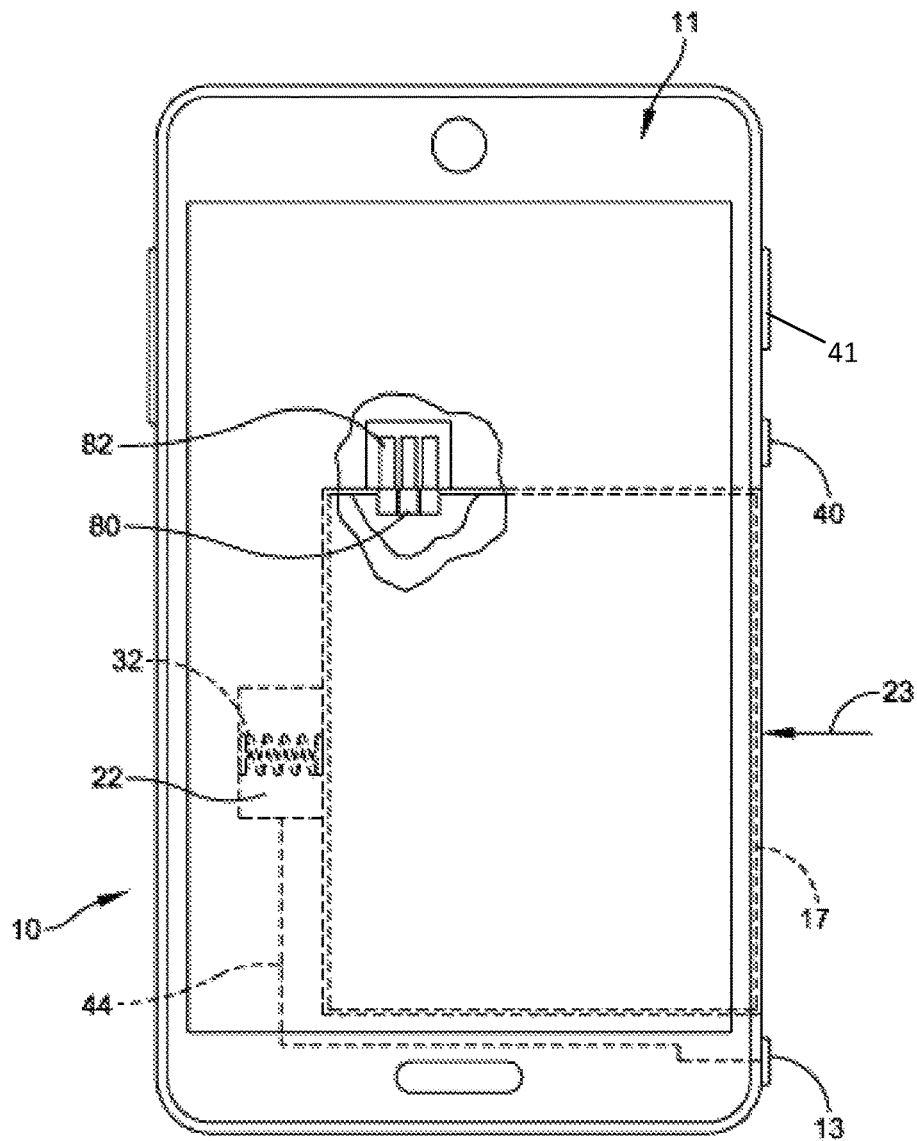
FIG. 6 is a plan view of the mobile computing device and battery showing further features.

Referring now to FIGS. 1 and 6, the battery 20 is considered as fully inserted and locked in place in the outer housing 11. In order to release the battery 20 for replacement thereof, the battery 20 at its front 17 may be pressed in the direction of arrow 23 in order to release the lock on the battery 20. Preferably, there also should be provided a spring 32 (refer to the schematic diagram of FIG. 6) associated with the docking pad 22, so that when the battery 20 is pressed in the direction of arrow 23, the spring 32 causes the battery 20 to be released outwardly from the outer housing 11 in the direction of arrow 15 (see FIG. 3). Thus, in this embodiment, the docking pad 22 functions as a locking mechanism but at the same time, when the battery 20 is pressed once again, this releases the locking mechanism, and the depicted spring 32 causes the battery 20 to be released outwardly. At that position, the user can then easily grasp the battery 20 and fully remove the battery 20 from the outer housing 11. Another charged battery 20 can then be installed in the elongated slot 14, pressed into the elongated slot 14 against the docking pad 22, and thus locked in position in readiness for activating mobile computing device 10. Again, the battery 20 can be easily removed when discharged by pressing in the direction of arrow 23 per FIG. 6 in order to release the battery 20 from the docking pad 22, releasing the battery 20 to a position where it can easily be removed. This arrangement is very convenient because, by a simple release mechanism, one can readily insert and subsequently release the battery 20.

In accordance with another embodiment of the present invention, rather than having the docking pad 22 lock and unlock based upon the motion of the battery 20, there is also provided a release button 13 such as illustrated in FIGS. 1-3 that can be depressed by the user as illustrated in FIG. 2. Reference also may be made to the plan view of FIG. 6 that shows the release button 13 and a connecting link 44 from the release button 13 to the docking pad 22. In this particular embodiment, ejection of the battery 20 is achieved by means of depressing the release button 13 rather than pressing against the outer surface of the battery 20 itself. In this embodiment, when the battery 20 is inserted, it is locked in position by means of the docking pad 22 functioning as a locking mechanism. This locking mechanism is then released by means of depressing the release button 13 on an outer surface of the housing 11.

Figure 4:
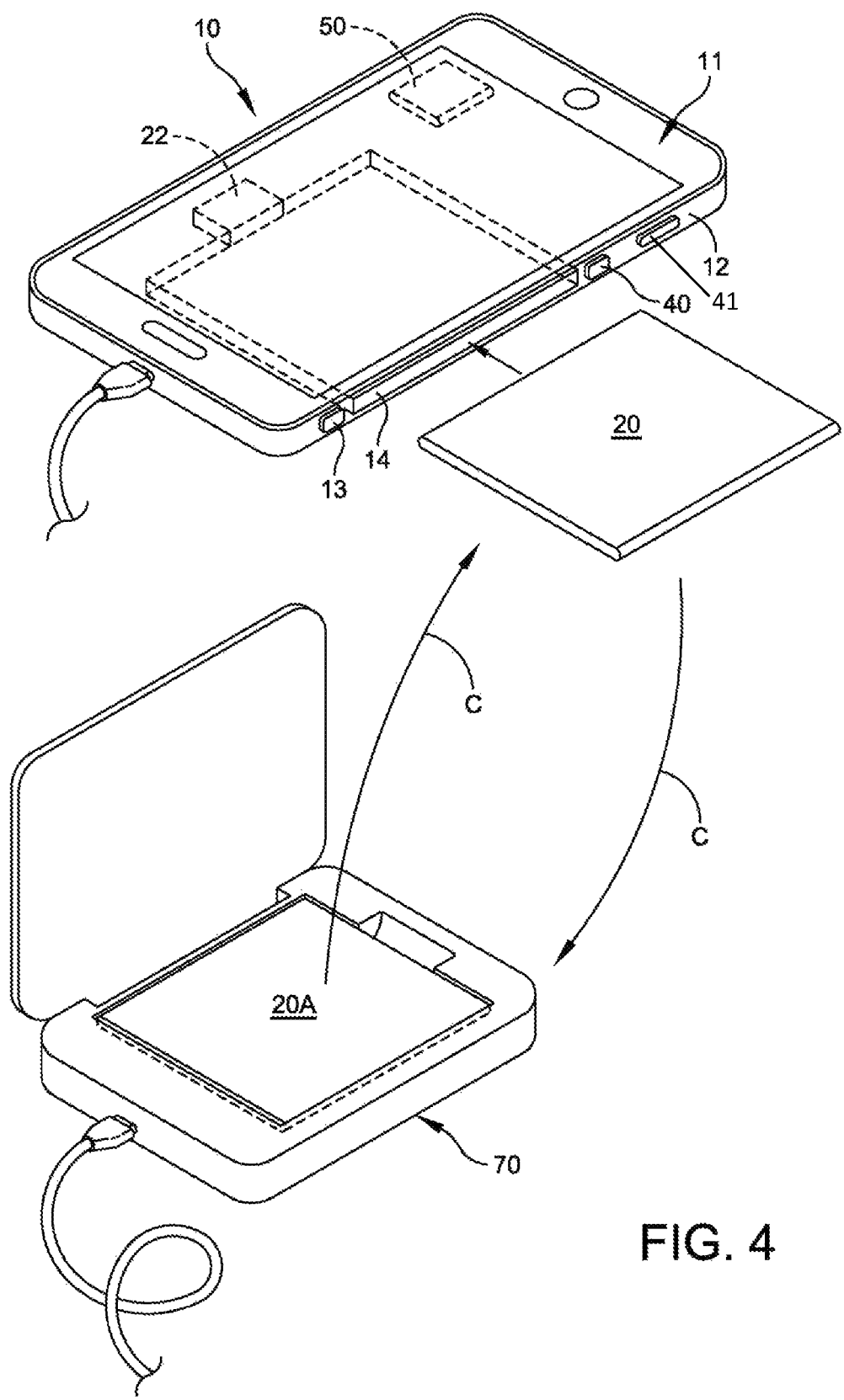
FIG. 4 is an exploded perspective view showing the mobile computing device and the battery, as well as a separate charging station.

Reference is now also made to FIG. 4 for a simple illustration of the substitution of a battery 20 between the mobile computing device 10 and the battery charger 70. In FIG. 4, a standard charger 70 is illustrated with a battery 20A disposed therein. In FIG. 4, the arrows C depict the swapping of the batteries 20, 20A so that a depleted energy battery can be replaced by a fully charged battery.

FIG. 6 also shows the release button 13 and the interconnecting link 44 that connects the release button 13 with the docking pad 22. FIG. 6 also schematically illustrates the release spring 32 that may be urged against an end wall of the battery 20. FIG. 6 also illustrates contacts 80 on the battery 20 and like-contacts 82 in the outer housing 11. Thus, when the battery 20 is fully installed, these contacts 80, 82 are bridged in order to provide power to the electronics 60 of mobile computing device 10. Refer also to an alternate embodiment shown in FIG. 9, which includes a docking pad 22 with the contacts 80 and 82 disposed at that location. FIG. 9 also illustrates a pair of springs 32 that may be considered as part of the docking pad 22 and disposed on either side of the contacts 80, 82.

In accordance with another aspect of the present invention, mobile computing device 10 also includes its own permanent battery 50 "built in" to keep the device 10 "ON" and thus undisturbed throughout the entire recharging or exchange process. Additionally, it is an objective of the present invention to provide the capability to charge multiple batteries at the same time mounted side-by-side, constructed and arranged to take any quantity (e.g., 1, 2, 3, 4, 5, 6, 7, 8, 9, 10, or more) batteries 20 next to each other for the comfort of an everlasting backup recharge battery 20.

With regard to the use of a permanent battery, refer in the figures to the permanent battery 50. Refer also to the circuit diagram of FIG. 7 illustrating the replacement battery at 20 and the permanent battery at 50. FIG. 7 also illustrates the parallel circuit 64 which connects both batteries 20, 50 essentially in parallel with the electronics 60 of mobile computing device 10. FIG. 7 also illustrates a disconnection node at D wherein the replaceable battery 20 is ejected and replaced. Even when that occurs, the permanent battery 50, by means of the parallel circuit 64, maintains power to electronics 60.

One main feature of the present invention is to provide a new mechanism to make it easier to replace the battery 20 in a cell phone or virtually any mobile computing device 10 that constantly need to be recharged multiple times, including, for example, tablets, notebooks, notepads, and virtually any other portable electronic device which constantly needs to be recharged. As illustrated herein, these devices 10 are built with an opening (e.g., elongated slot 14) on the side to insert the charged battery 20. To recharge the devices, one would simply press a release button 13, which releases a spring mechanism 32 that ejects that drained battery 20 out on the side of the device 10. One would remove it and replace it with another charged one, which was being recharged on the side (e.g., on an external charger 70).

In some embodiments, these batteries 20 have a design characteristic to allow them to slide-in easily into the device 10. More specifically, in some cases, a groove on the side of battery 20 allows it to slide easily into the device 10, which has a corresponding edge. This may be in the form of a tongue-and-groove structure between the battery 20 and its accommodating elongated slot 14. In accordance with some embodiments, only those types of batteries 20 provided with such a groove may be permitted to be inserted in mobile computing device 10.

The present invention also proposes that all subscriber identity module (SIM) cards and secure digital (SD) memory cards have slots on the side of the devices for faster, easy access. The present invention also introduces a new technique that will allow one to make a quick "Emergency Distress Call" particularly for extreme emergency situations, where one may not be able to see, talk, or have time to use a phone keypad. By simply holding the emergency distress call (EDC) button 40 for a given period (e.g., 2 seconds or any other desired time interval), a low-volume prompt can be heard and a yes-or-no text pops up on display. Pressing the EDC button again will automatically call 9-1-1 and discretely turn "on" your global positioning system (GPS) location and perhaps even your handset, and more, a second button to alert family, friends, and relatives, which can be canceled by the home button. As will be appreciated in light of this disclosure, these features may affect the device's accessories, including, for instance, phone covers, pouches, cases, etc., virtually any items related to the change. Furthermore, any objects such as a new electrical outlet plug may be implemented for the practical use of the invention.

In the present invention, this allows a user's mobile computing 10 to stay on as the battery 20 is being replaced. Also, no mechanical forces and no use of electrical energy will be needed to accomplish this task. Everything is manual and can be accomplished anywhere in the world very quickly whether you are in a desert, a jungle, or anywhere else in the world, all it requires is that you stay prepared by keeping up a few extra-charge batteries with you at all times.

In the drawings, in addition to the battery release button 13, there is also illustrated a further button 40. This may be the EDC (e.g., instant 9-1-1) button 40. Next to the button 40 is a power button at 41. As previously noted, in some embodiments, release button 13 optionally may be disposed proximate power button 41. In some embodiments, release button 13 optionally may be disposed proximate battery compartment 108.

Reference is also now made to FIG. 8 for an alternate charging apparatus 72. This is particularly useful for charging multiple batteries 20 at the same time. FIG. 8 shows a single battery 20. However, multiple batteries 20 can be inserted into each of the parallel arranged slots 74. Each slot 74 includes a connector for receiving the battery terminals. These connectors are arranged in a parallel circuit so that a charging signal from the input line 73 is coupled to each of the connectors at the respective slots 74.

Figure 10:
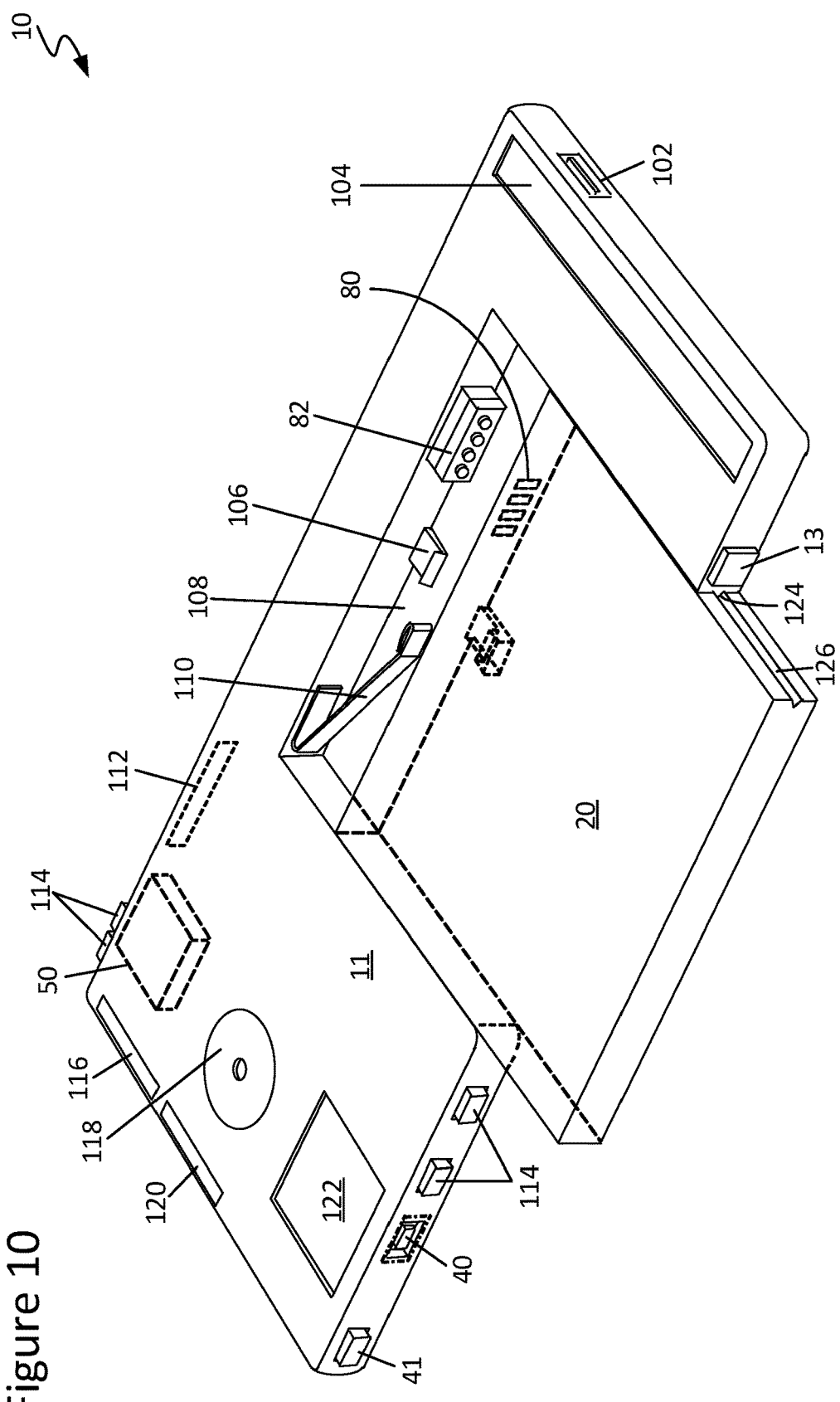
FIG. 10 illustrates an isometric view of a mobile computing device configured in accordance with an embodiment of the present disclosure.
Figure 11:
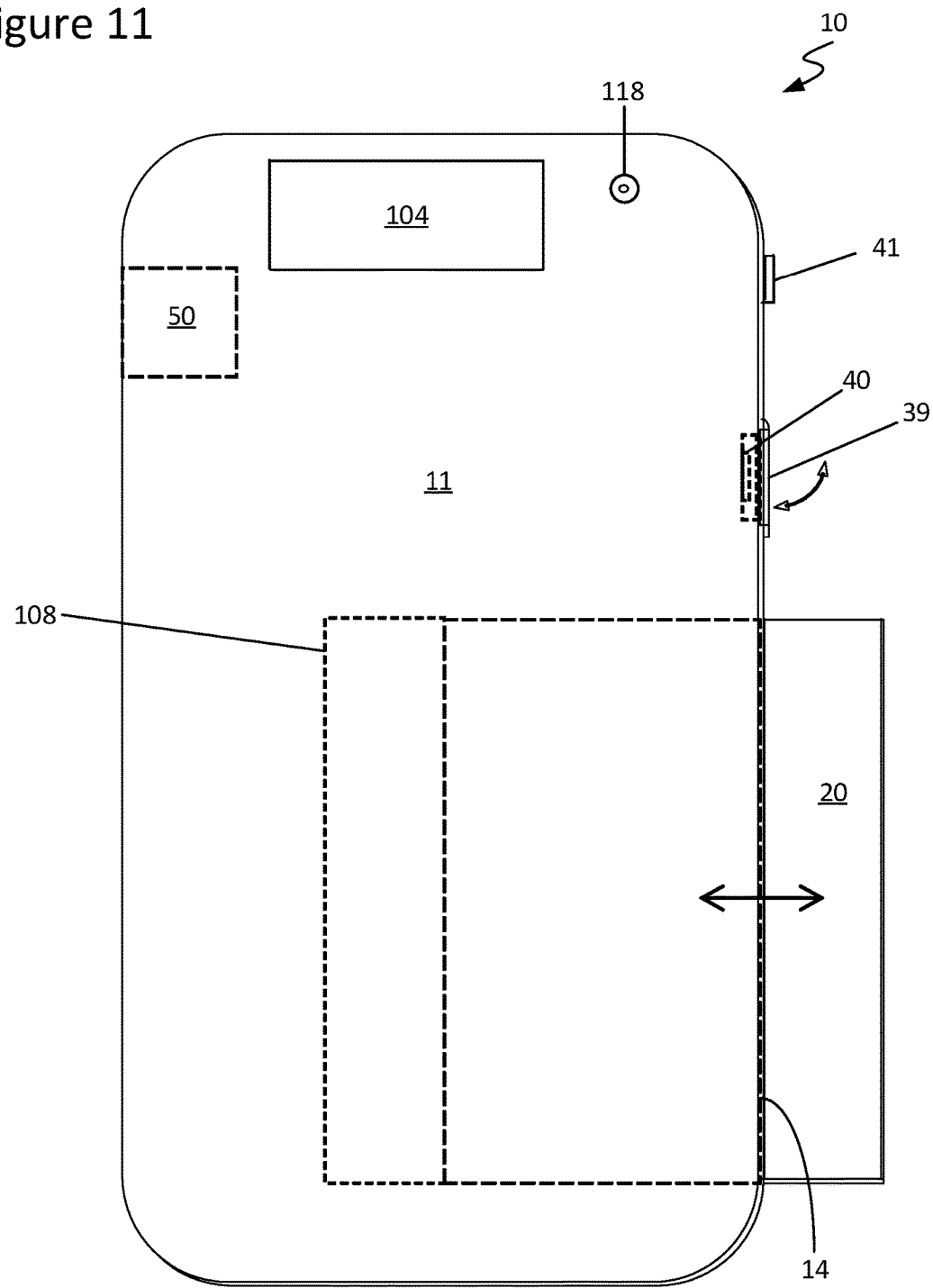
FIG. 11 illustrates a side elevation view of a mobile computing device configured in accordance with an embodiment of the present disclosure.

FIG. 10 illustrates an isometric view of a mobile computing device 10 configured in accordance with an embodiment of the present disclosure. FIG. 11 illustrates a side elevation view of a mobile computing device 10 configured in accordance with an embodiment of the present disclosure. As can be seen here, mobile computing device 10 may be configured such that primary battery 20 may slide directly into battery compartment 108 from the side (or end) thereof. To this end, outer housing 11 may include an opening 14 on its side 12 through which primary battery 20 can be inserted in a sliding manner. Thus, a depleted primary battery 20 may slide out from battery compartment 108, through opening 14, and an energized primary battery 20 may be inserted therein. When primary battery 20 resides within battery compartment 108, its contacts 80 may interface with contacts 82 of mobile computing device 10. To facilitate this sliding movement, battery compartment 108 optionally may include a protruding lip, a recessed channel, or other suitable guidance feature 124 that physically guides primary battery 20 into position in battery compartment 108. Primary battery 20 optionally may include a complementary guidance feature 126 configured to interface with guidance feature 124 of battery compartment 108.

In some cases, battery compartment 108 may be located, at least in part, at the surface of outer housing 11. Thus, when primary battery 20 is inserted within battery compartment 108, it may reside on outer housing 11. In such instances, primary battery 20 may be accessible from the front, back, and/or side of mobile computing device 10. In this configuration, when a depleted primary battery 20 is removed from battery compartment 108, the exposed battery compartment 108 may leave a gap in outer housing 11 that interrupts the continuity of the surface contour of outer housing 11 in that region. However, when an energized primary battery 20 is reinserted in battery compartment 108, the presence of that primary battery 20 may fill the gap, restoring the continuity of the surface contour in the region of outer housing 11 previously interrupted by the gap. Thus, primary battery 20 may be configured to serve, at least in part, as an integral portion of outer housing 11, becoming substantially coplanar therewith, at least in some cases. In other cases, primary battery 20 may be recessed, to a given degree, below the plane of the surface of outer housing 11. In some still other cases, primary battery 20 may protrude, to a given degree, beyond the plane of the surface of outer housing 11.

In some other cases, battery compartment 108 may be located entirely within the interior confines of outer housing 11, below the surface of outer housing 11. Thus, when primary battery 20 is inserted within battery compartment 108, it may reside within the interior of outer housing 11. In such instances, primary battery 20 may not be accessible but from the side and/or end of mobile computing device 10.

Figure 12:
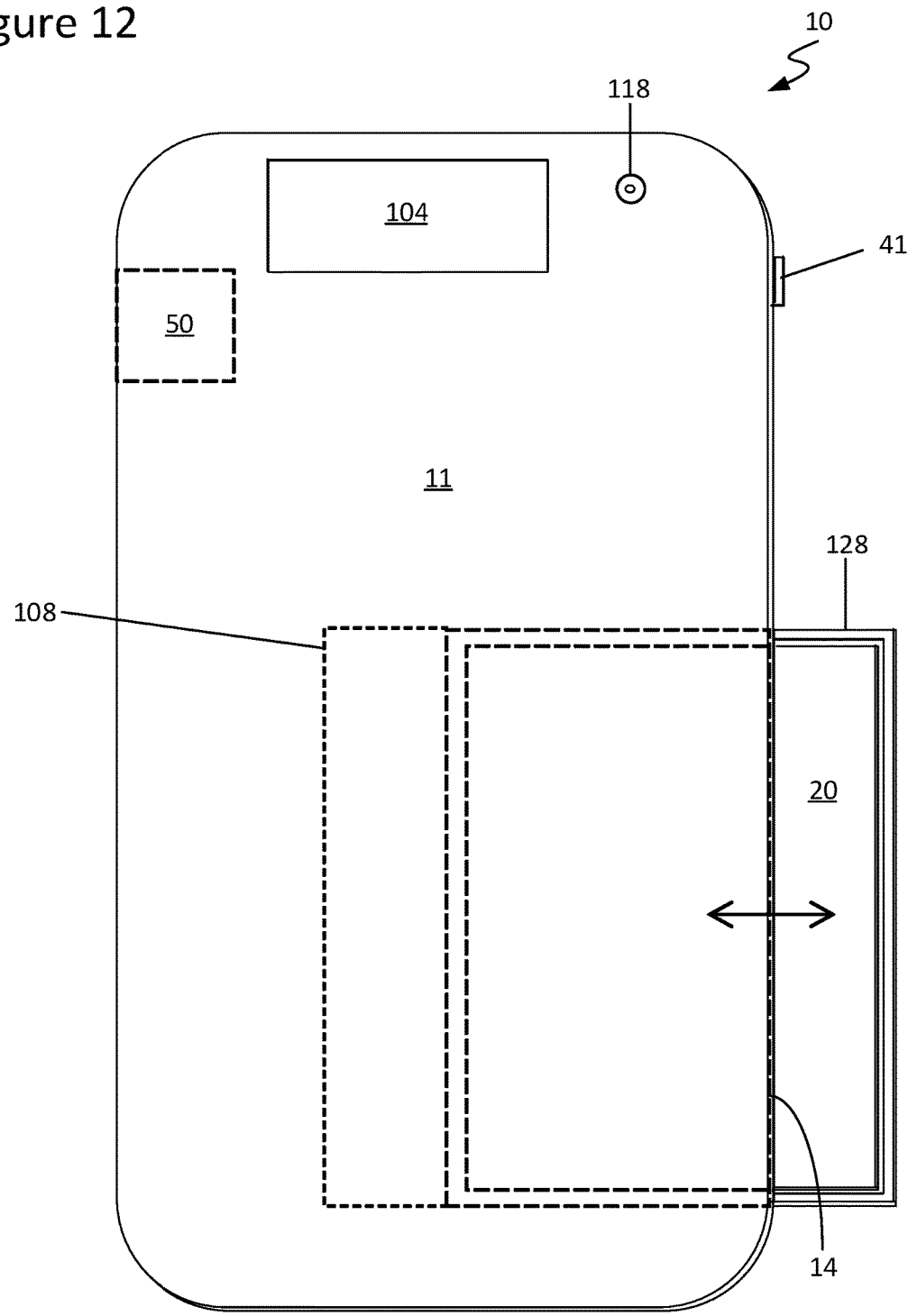
FIG. 12 illustrates a side elevation view of a mobile computing device configured in accordance with an embodiment of the present disclosure.

FIG. 12 illustrates a side elevation view of a mobile computing device 10 configured in accordance with an embodiment of the present disclosure. As can be seen here, primary battery 20 may slide into battery compartment 108, through opening 14, from the side 12 of mobile computing device 10 with the help of a tray 128 inserted within battery compartment 108 (e.g., like a drawer in a dresser) and configured to receive and retain primary battery 20. Thus, in such embodiments, tray 128 may slide out, in part or in whole, from battery compartment 108, through opening 14, such that a depleted primary battery 20 may be removed therefrom and an energized primary battery 20 may be reinserted therein. Tray 128 then may slide back into battery compartment 108, through opening 14, such that primary battery 20 resides within battery compartment 108 and contacts 80 of primary battery 20 may interface with contacts 82 of mobile computing device 10.

In accordance with some embodiments, mobile computing device 10 optionally may include a locking mechanism 106 (e.g., such as docking pad 22, discussed above) configured to physically engage primary battery 20 and retain it in position within battery compartment 108. Specifically, locking mechanism 106 may be configured to engage primary battery 20 in a manner that prevents inadvertent disengagement of contacts 80 from contacts 82. To such ends, locking mechanism 106 may be configured to prevent or otherwise reduce movement of primary battery 20 in a horizontal and/or vertical manner within battery compartment 108. In some cases, primary battery 20 may include one or more features configured to interface with locking mechanism 106 to facilitate such retention.

When optionally included, locking mechanism 106 may need to be disengaged before primary battery 20 may be removed from battery compartment 108. In some embodiments, mobile computing device 10 may be configured such that primary battery 20 may be pressed further into opening 14, causing disengagement between locking mechanism 106 and primary battery 20 and thereby allowing that primary battery 20 to be removed from battery compartment 108 through opening 14. In some other embodiments, mobile computing device 10 may include a release button 13 on its exterior that is configured to be pushed or otherwise activated by a user to cause disengagement between locking mechanism 106 and primary battery 20 and thereby allow primary battery 20 to be removed from battery compartment 108 through opening 14. Furthermore, in reinserting primary battery 20 into battery compartment 108, locking mechanism 106 may reengage primary battery 20 automatically to secure it within battery compartment 108, preventing unwanted slippage from battery compartment 108. Other suitable configurations for optional locking mechanism 106 will depend on a given application and will be apparent in light of this disclosure.

Figure 13:
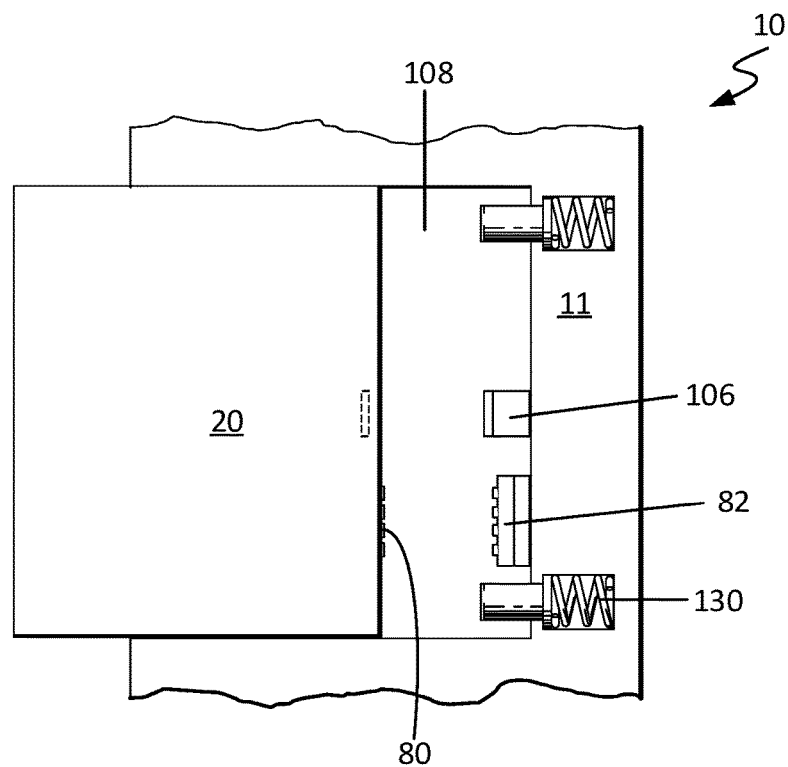
FIG. 13 illustrates a partial side elevation view of a mobile computing device configured in accordance with another embodiment of the present disclosure.
Figure 14:
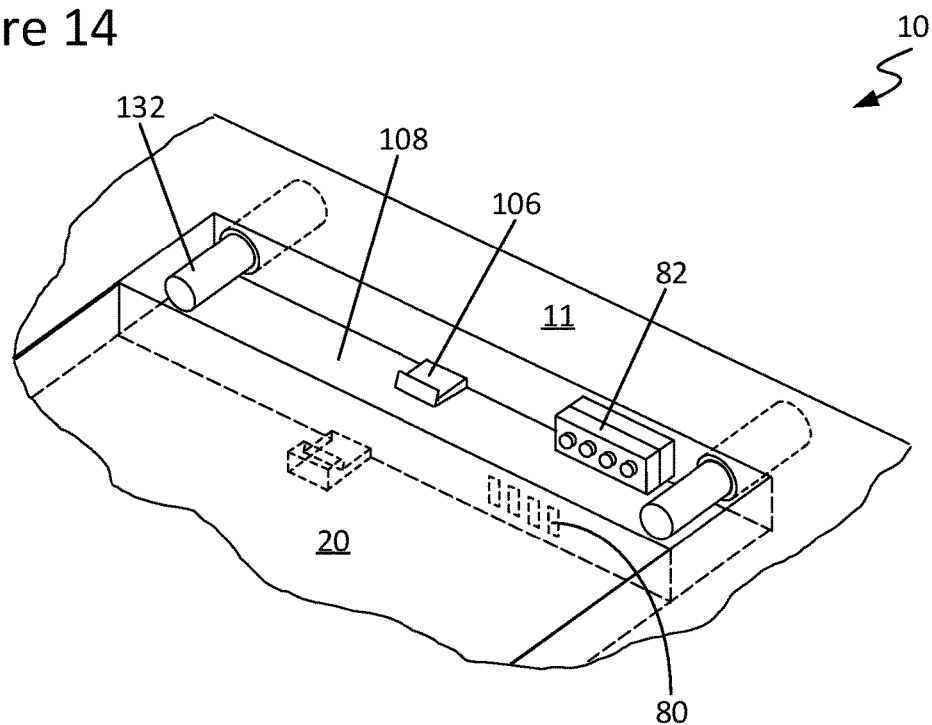
FIG. 14 illustrates a partial side elevation view of a mobile computing device configured in accordance with another embodiment of the present disclosure.

In accordance with some embodiments, mobile computing device 10 optionally may include one or more biasing mechanisms configured to maintain physical engagement between primary battery 20 and locking mechanism 106. The optional biasing mechanism may be of any of a wide range of configurations. For instance, in some embodiments, the biasing mechanism may be a compression spring arm 110, as generally shown in FIG. 10. However, the present disclosure is not intended to be so limited. For instance, consider FIG. 13, which illustrates a partial side elevation view of a mobile computing device 10 configured in accordance with another embodiment of the present disclosure. As can be seen here, in some embodiments, the biasing mechanism may be a helical coil spring 130, configured as typically done and arranged as generally shown. Also, consider FIG. 14, which illustrates a partial side elevation view of a mobile computing device 10 configured in accordance with another embodiment of the present disclosure. As can be seen here, in some embodiments, the biasing mechanism may be one or more compression pistons 132, configured as typically done and arranged as generally shown. In some cases, only a single type of biasing mechanism may be employed, whereas in other cases, multiple types may be utilized. The quantity and arrangement of biasing mechanisms may be customized, as desired for a given target application or end-use. Other suitable configurations for optional biasing mechanism(s) will depend on a given application and will be apparent in light of this disclosure.

In accordance with some embodiments, mobile computing device 10 optionally may be configured to provide a liquid-tight and/or gas-tight seal between primary battery 20 and outer housing 11 when primary battery 20 is interfaced with battery compartment 108. To that end, rubber, silicone, or other suitable sealing material may be disposed between outer housing 11 and primary battery 20. In some cases, mobile computing device 10 may include a small stepped region, for instance, in opening 14 at the entrance of battery compartment 108, and the sealing material may be disposed in that region. Other suitable configurations and means for providing optional sealing will depend on a given application and will be apparent in light of this disclosure.

Figure 15:
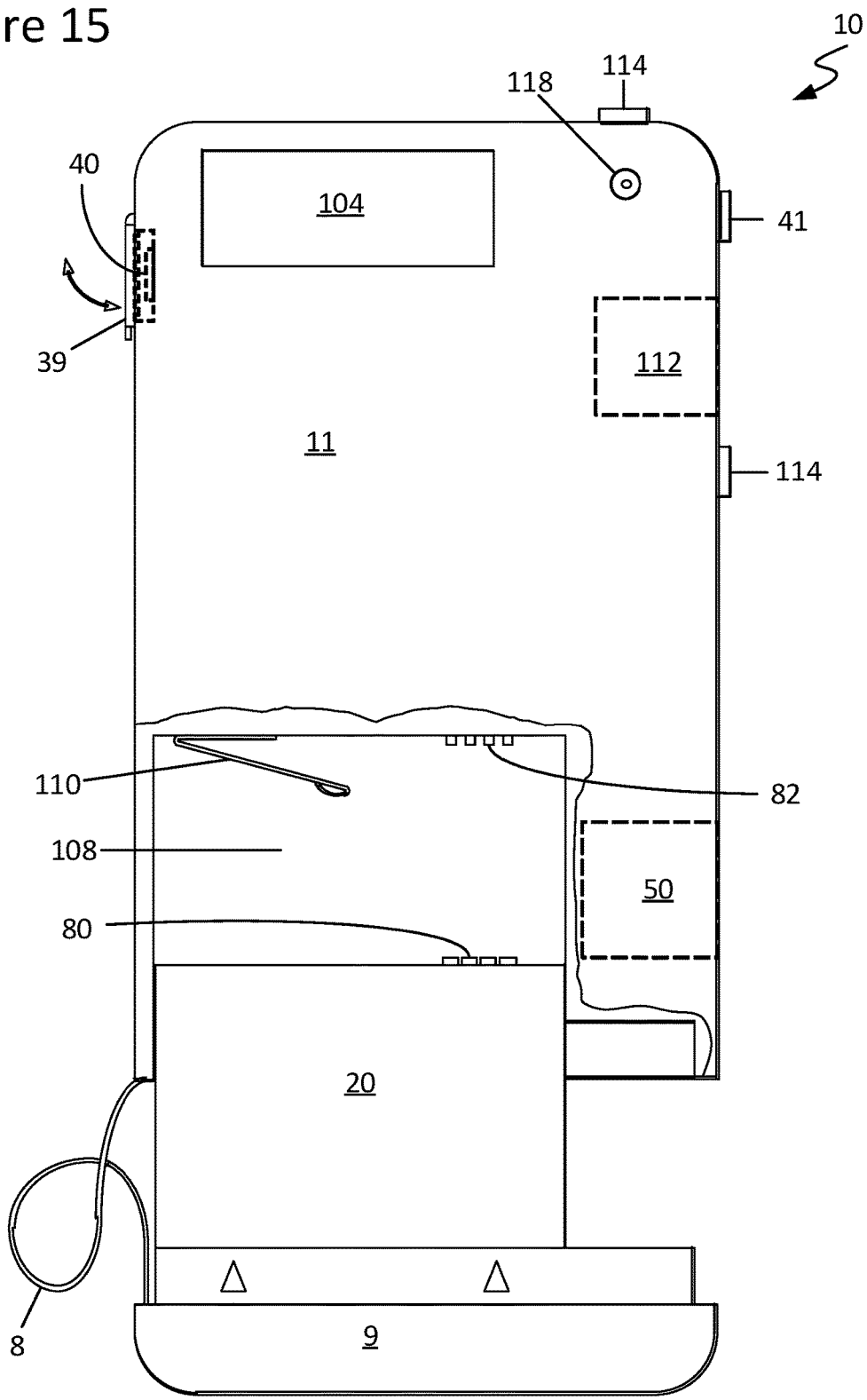
FIG. 15 illustrates a side elevation view including a cutaway portion of a mobile computing device configured in accordance with an embodiment of the present disclosure.

FIG. 15 illustrates a side elevation view including a cutaway portion of a mobile computing device 10 configured in accordance with an embodiment of the present disclosure. As can be seen here, mobile computing device 10 may be configured such that base portion 9 of outer housing 11 may be detached, exposing battery compartment 108 and primary battery 20. In some cases, base portion 9 and primary battery 20 may be configured to be coupled together. Thus, in removing base portion 9, primary battery 20 may slide out of battery compartment 108 in tandem. The depleted primary battery 20 may be removed from base portion 9, and an energized primary battery 20 may be recoupled with base portion 9. Base portion 9 then may be reattached to the remainder of outer housing 11 such that primary battery 20 resides within battery compartment 108 and contacts 80 of primary battery 20 may interface with contacts 82 of mobile computing device 10.

In other cases, base portion 9 and primary battery 20 may be separated. Thus, base portion 9 may be removed first (e.g., like an end cap) from the end of mobile computing device 10, and the depleted primary battery 20 may slide out of battery compartment 108 independently. An energized primary battery 20 may be reinserted within battery compartment 108 such that primary battery 20 resides within battery compartment 108 and contacts 80 of primary battery 20 may interface with contacts 82 of mobile computing device 10, and base portion 9 then may be reattached to the remainder of outer housing 11.

In some cases, base portion 9 optionally may be attached to the remainder of outer housing 11 of mobile computing device 10, for example, via a cable or other suitable tethering mechanism 8. Inclusion of tethering mechanism 8 may help to avoid misplacing of base portion 9 while removing a depleted primary battery 20 and/or installing an energized primary battery 20, at least in some instances.

Figure 16:
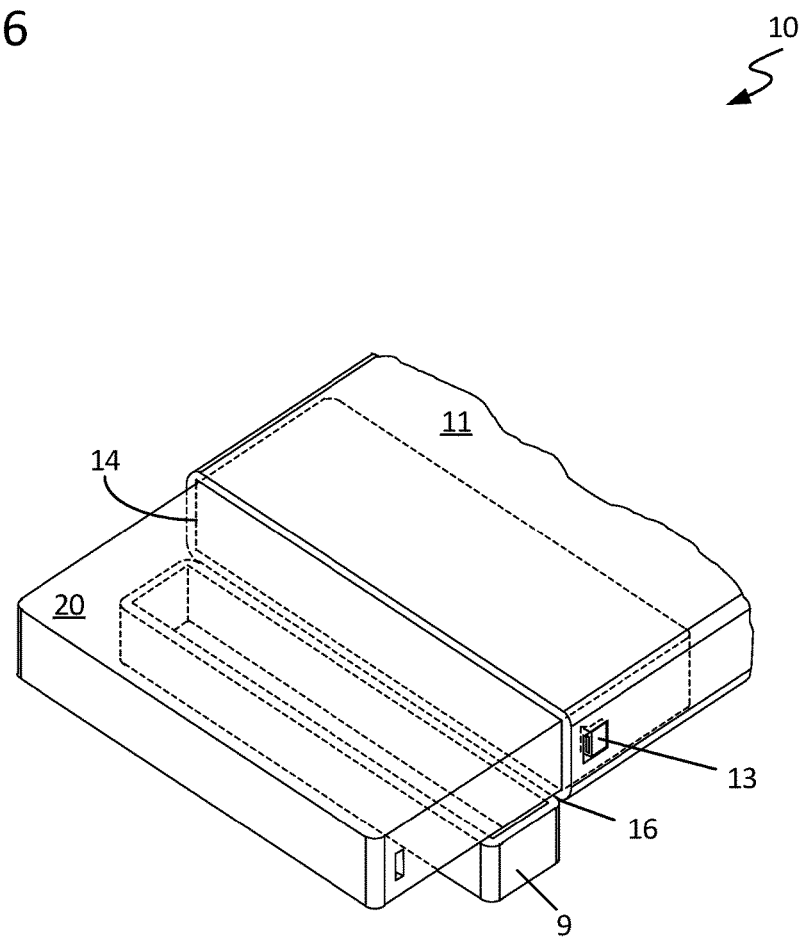
FIG. 16 illustrates a partial isometric view of a mobile computing device configured in accordance with an embodiment of the present disclosure.

FIG. 16 illustrates a partial isometric view of a mobile computing device 10 configured in accordance with an embodiment of the present disclosure. As can be seen here, mobile computing device 10 may be configured such that base portion 9 of outer housing 11 may pivot at a hinge 16, exposing battery compartment 108 and primary battery 20. Specifically, hinge 16 may be configured to allow base portion 9 to flip away from and/or toward the remainder of outer housing 11. In such cases, base portion 9 and primary battery 20 may be separate, and thus base portion 9 may be rotated about hinge 16 first, and the depleted primary battery 20 may slide out of battery compartment 108 independently.

An energized primary battery 20 may be reinserted within battery compartment 108 such that primary battery 20 resides within battery compartment 108 and contacts 80 of primary battery 20 may interface with contacts 82 of mobile computing device 10, and base portion 9 then may be rotated back and reattached to the remainder of outer housing 11.

Figure 17:
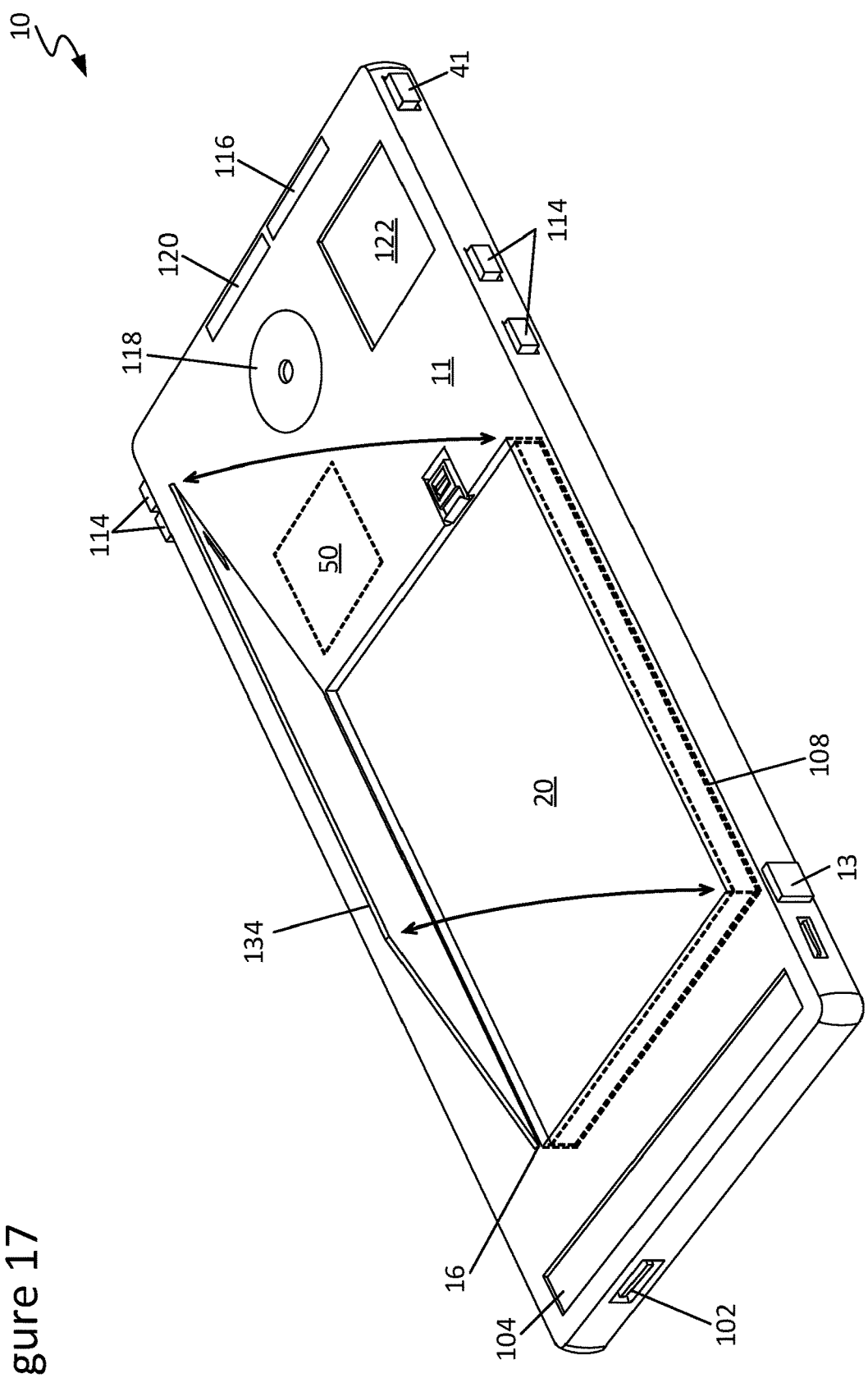
FIG. 17 illustrates an isometric view of a mobile computing device configured in accordance with an embodiment of the present disclosure.

FIG. 17 illustrates an isometric view of a mobile computing device 10 configured in accordance with an embodiment of the present disclosure. As can be seen here, mobile computing device 10 may be configured such that its outer housing 11 includes a door 134 that may pivot at a hinge 16, exposing battery compartment 108 and primary battery 20. Specifically, hinge 16 may be configured to allow door 134 to flip away from and/or toward outer housing 11. Door 134 may be provided at either (or both) of the front and the back of mobile computing device 10, with a corresponding arrangement of hinge(s) 16. Door 134 may be opened by rotating it about hinge 16 away from outer housing 11, and the depleted primary battery 20 may be removed from battery compartment 108. An energized primary battery 20 may be reinserted within battery compartment 108 such that primary battery 20 resides within battery compartment 108 and contacts 80 of primary battery 20 may interface with contacts 82 of mobile computing device 10, and door 134 then may be closed by rotating it about hinge 16 toward outer housing 11. Optionally, a retainer tab may be included to maintain door 134 in a closed position.

Figure 18:
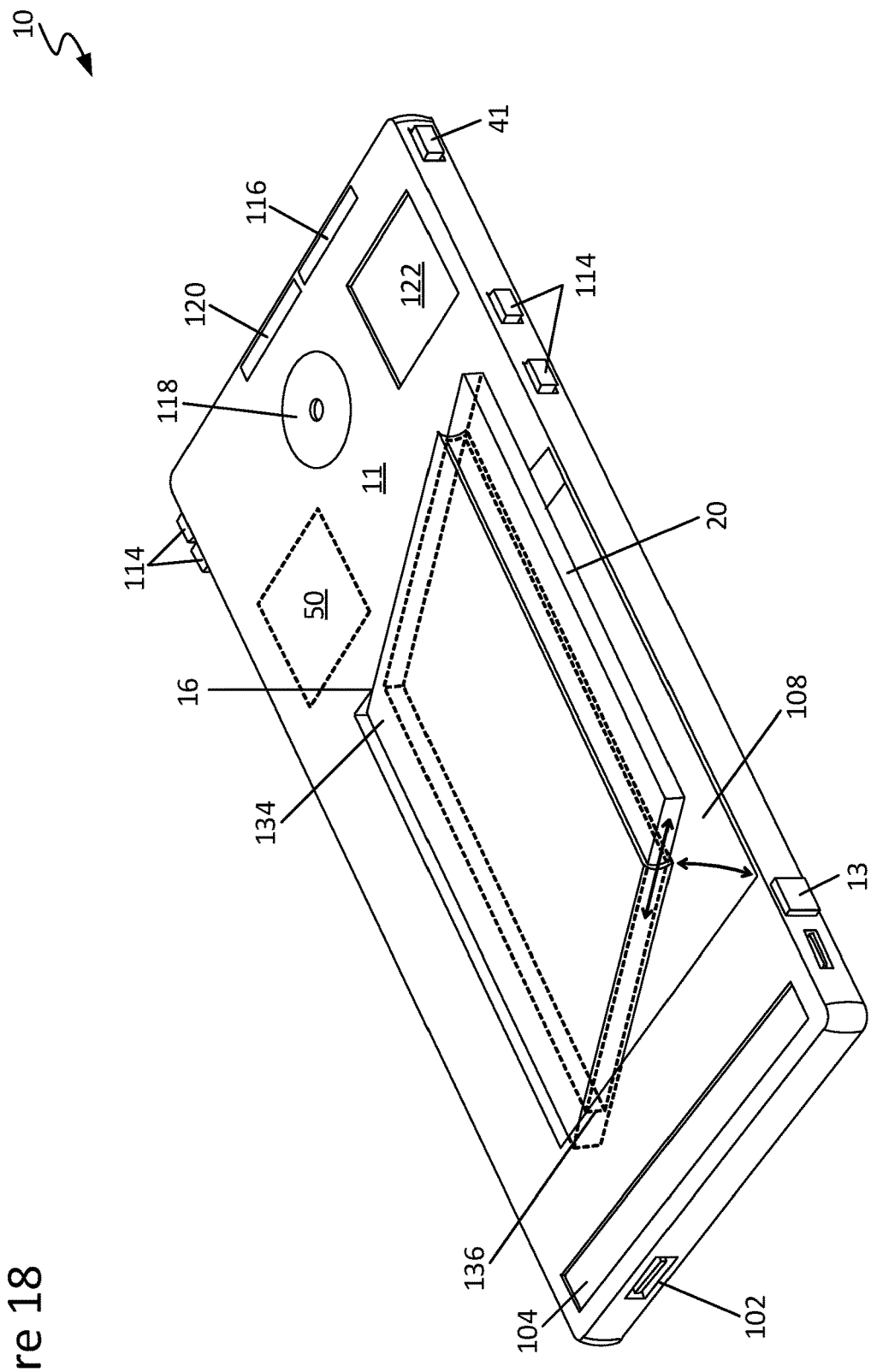
FIG. 18 illustrates an isometric view of a mobile computing device configured in accordance with an embodiment of the present disclosure.

FIG. 18 illustrates an isometric view of a mobile computing device 10 configured in accordance with an embodiment of the present disclosure. As can be seen here, as with the example embodiment of FIG. 17 (discussed above), mobile computing device 10 may include a door 134 and hinge 16. Door 134 further may include a carriage portion 136 configured to receive and retain primary battery 20. Door 134 and carriage portion 136 may operate, in a general sense, similar to a cassette deck door on a cassette player. Door 134 may be opened by rotating it about hinge 16 away from outer housing 11, and the depleted primary battery 20 may be removed from battery compartment 108 by virtue of its placement in carriage portion 136, which is removed from battery compartment 108 in tandem with door 134. The depleted primary battery 20 then may be removed from carriage portion 136, and an energized primary battery 20 may be reinserted within carriage portion 136. Door 134 then may be closed by rotating it about hinge 16 toward outer housing 11, and the energized primary battery 20 may be inserted within battery compartment 108 by virtue of carriage portion 136 in which it resides. The energized primary battery 20 may be reinserted within battery compartment 108 such that primary battery 20 resides within battery compartment 108 and contacts 80 of primary battery 20 may interface with contacts 82 of mobile computing device 10.

Figure 19:
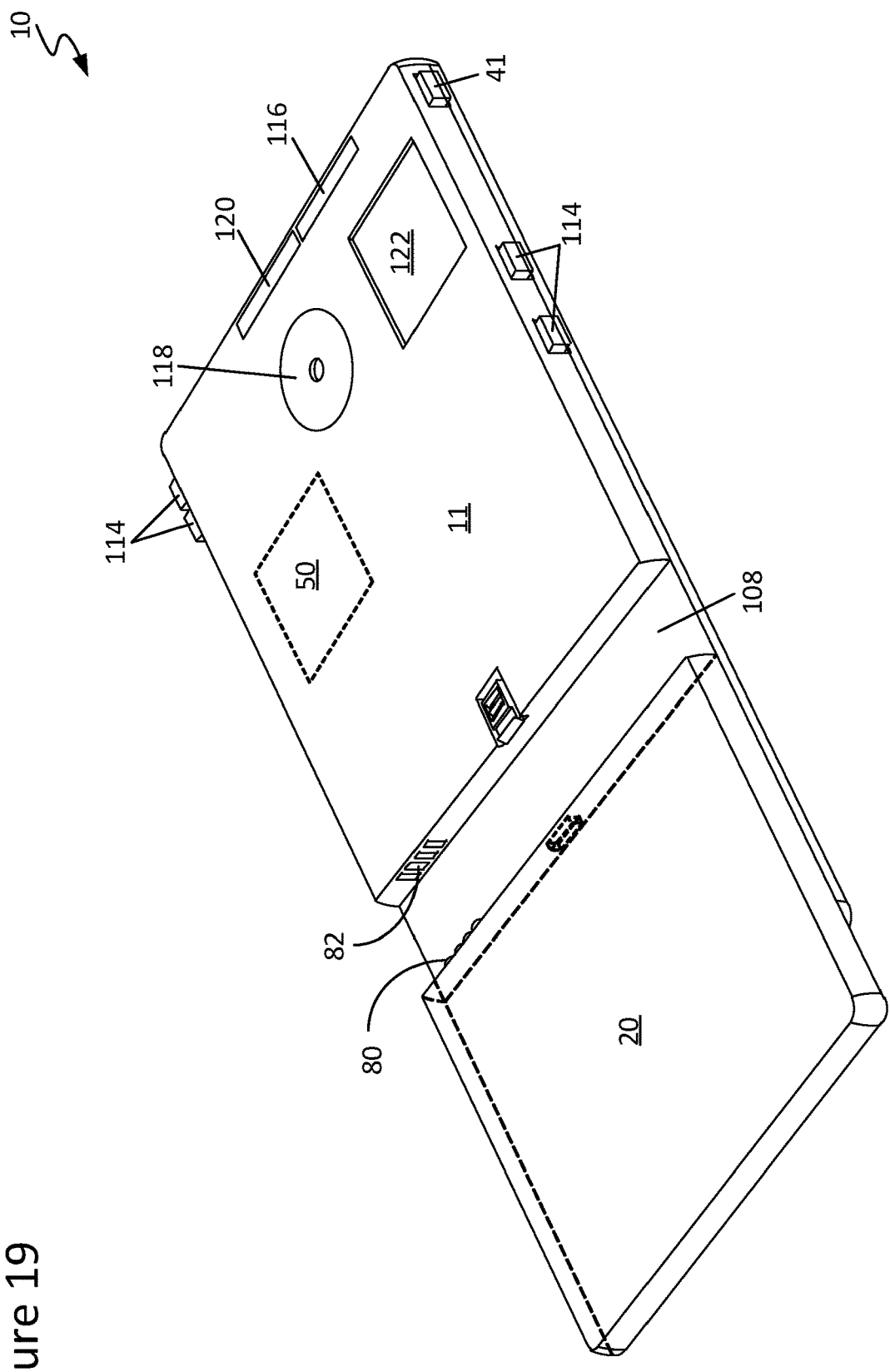
FIG. 19 illustrates an isometric view of a mobile computing device configured in accordance with an embodiment of the present disclosure.

FIG. 19 illustrates an isometric view of a mobile computing device 10 configured in accordance with an embodiment of the present disclosure. As can be seen here, mobile computing device 10 may be configured such that primary battery 20 may be mounted on outer housing 11 (e.g., directly or with one or more intervening elements). To that end, primary battery 20 may snap onto, clip onto, or slide onto (from a side or an end) outer housing 11. When primary battery 20 is so mounted, its contacts 80 may interface with contacts 82 of mobile computing device 10. To facilitate this sliding and/or snapping movement, outer housing 11 optionally may include a guidance feature 124 (discussed above) that physically guides primary battery 20 into position, and primary battery 20 may include a complementary guidance feature 126 (discussed above).

In some cases, battery compartment 108 may be located, at least in part, at the surface of outer housing 11. Thus, when primary battery 20 is inserted within battery compartment 108, it may reside on outer housing 11. In such instances, primary battery 20 may be accessible from the front, back, and/or side 12 of mobile computing device 10. In this configuration, when a depleted primary battery 20 is removed from battery compartment 108, the exposed battery compartment 108 may leave a gap in outer housing 11 that interrupts the continuity of the surface contour of outer housing 11 in that region. However, when an energized primary battery 20 is remounted to outer housing 11 (i.e., effectively at the battery compartment 108), the presence of that primary battery 20 may fill the gap, restoring the continuity of the surface contour in the region of outer housing 11 previously interrupted by the gap. Thus, primary battery 20 may be configured to serve, at least in part, as an integral portion of outer housing 11, becoming substantially coplanar therewith, at least in some cases. In other cases, primary battery 20 may be recessed, to a given degree, below the plane of the surface of outer housing 11. In some still other cases, primary battery 20 may protrude, to a given degree, beyond the plane of the surface of outer housing 11. In some instances, when primary battery 20 is so mounted to outer housing 11, it may occupy the full width of outer housing 11, whereas in other instances, it may occupy less than the full width of outer housing 11.

Figure 20:
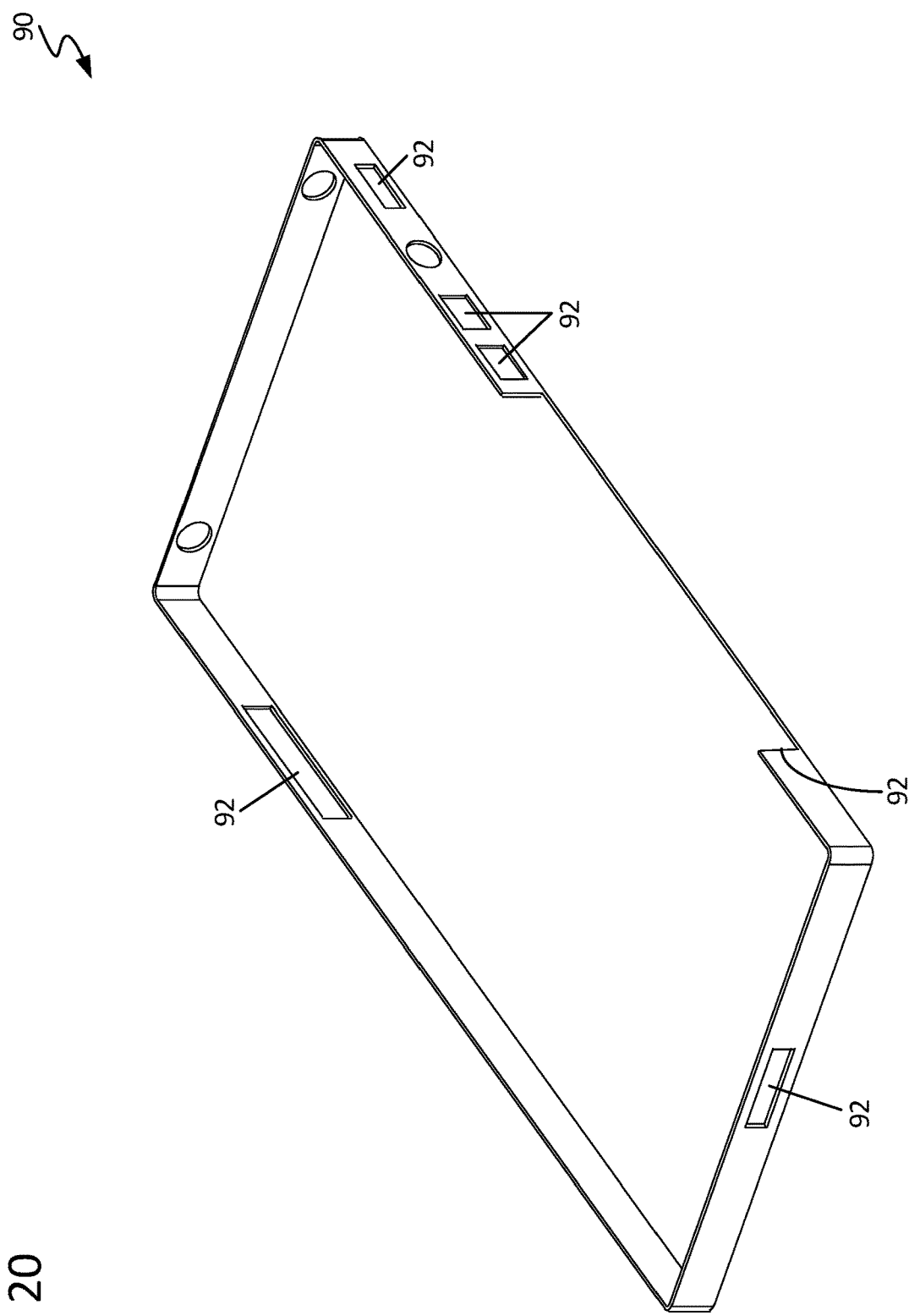
FIG. 20 illustrates an isometric view of a case for a mobile computing device configured in accordance with an embodiment of the present disclosure.

As will be appreciated in light of this disclosure, it may be desirable to provide a protective case compatible with mobile computing device 10 including any one or more of the various battery replacement and enhancement features described herein. With that, consider FIG. 20, which illustrates an isometric view of a case 90 for mobile computing device 10 configured in accordance with an embodiment of the present disclosure. As can be seen, case 90 may be configured to hold, support, or otherwise attach to outer housing 11 of mobile computing device 10 while also accommodating any of the various battery replacement configurations, physical buttons, interface slots, power supply/charging configurations, and integrated devices described herein. To these ends, case 90 may include various recesses and openings 92, as generally shown, local to a given corresponding feature of mobile computing device 10.

Figure 21:
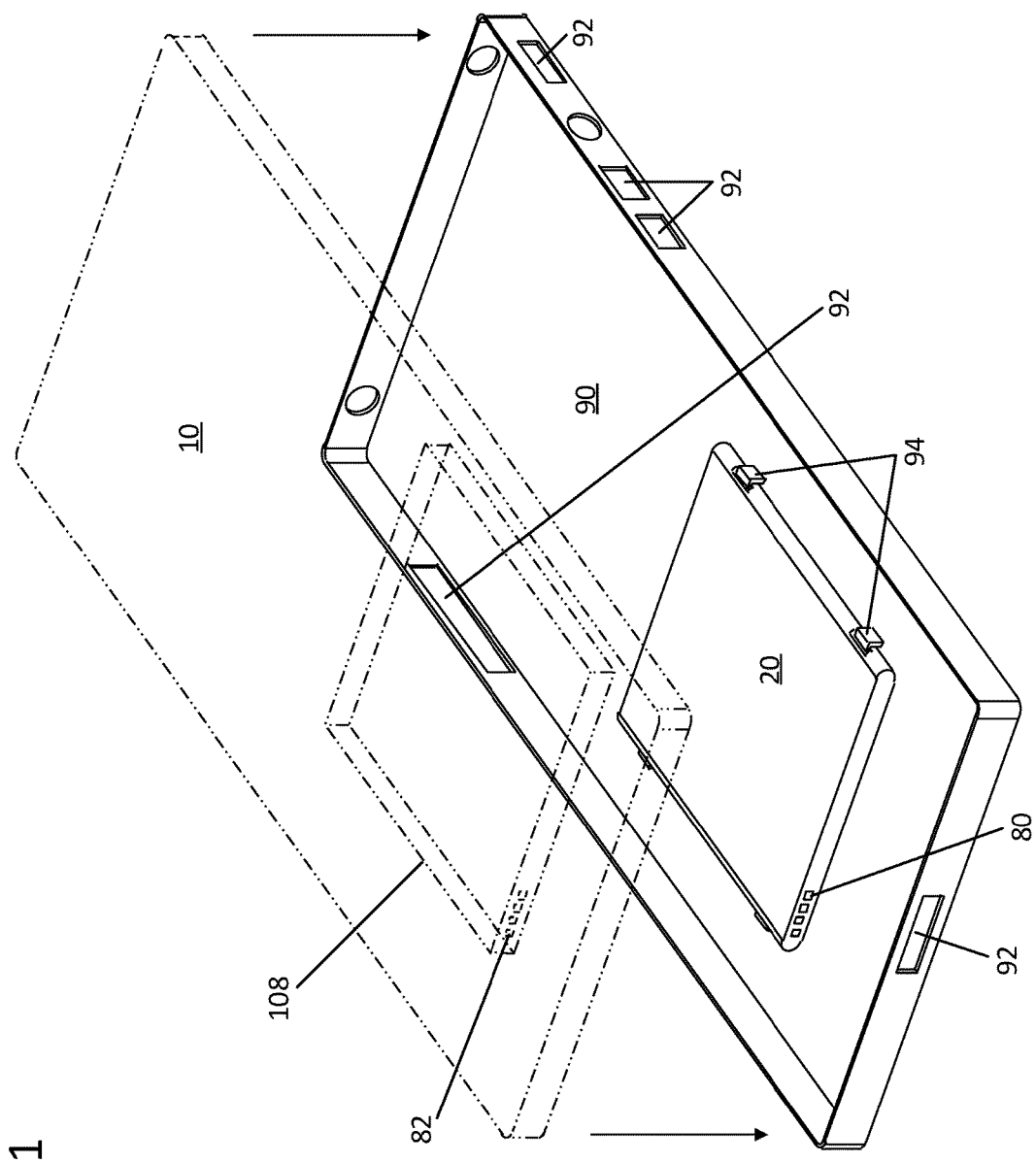
FIG. 21 illustrates an exploded isometric view of a mobile computing device and a corresponding case configured in accordance with an embodiment of the present disclosure.

In accordance with some embodiments, case 90 may be configured to provide power to mobile computing device 10. For instance, consider FIG. 21, which illustrates an exploded isometric view of a mobile computing device 10 and a corresponding case 90 configured in accordance with an embodiment of the present disclosure. As can be seen here, case 90 may be configured to host primary battery 20 directly, and mobile computing device 10 may be configured such that its battery compartment 108 aligns with primary battery 20 (hosted by case 90) when case 90 is interfaced with outer housing 11. Thus, in removing case 90 from mobile computing device 10, primary battery 20 may be removed from battery compartment 108 in tandem. In some cases, case 90 may include a retainer portion 94 configured to receive and retain primary battery 20. In some instances, the portion of case 90 that covers, in part or in whole, battery compartment 108 optionally may be transparent or translucent. As will be appreciated in light of this disclosure, it may be desirable to ensure that primary battery 20 is as thin as possible in profile to reduce bulkiness of the mobile computing device 10 and case 90 assembly.

Case 90 may be removed from outer housing 11, and the depleted primary battery 20 may be removed from battery compartment 108 by virtue of its placement in retainer portion 94, which is removed in tandem with case 90. The depleted primary battery 20 then may be removed from retainer portion 94, and an energized primary battery 20 may be reinserted within retainer portion 94. Case 90 then may be reapplied to outer housing 11, and the energized primary battery 20 may be inserted within battery compartment 108 by virtue of retainer portion 94 in which it resides. The energized primary battery 20 may be reinserted within battery compartment 108 such that primary battery 20 resides within battery compartment 108 and contacts 80 of primary battery 20 may interface with contacts 82 of mobile computing device 10. In some embodiments, a user may have the option to recharge primary battery 20 while it is installed in mobile computing device 10. In some instances, a user may power mobile computing device 10 directly through case 90, bypassing primary battery 20, secondary battery 50, or both. In some instances, secondary battery 50 may be charged by case 90 while mobile computing device 10 is powered by case 90. In some embodiments, case 90 may include a solar cell (e.g., such as a photovoltaic module 104, discussed below) through which electrical power may be generated and provided to primary battery 20, secondary battery 50, and/or mobile computing device 10 through electronics 60. Primary battery 20 may be inserted within case 90 from any side or end thereof, in accordance with some embodiments. In some instances, case 90 may include one or more integrated batteries of a type similar, for example, to either (or both) primary batter 20 and secondary battery 50.

Figure 22:
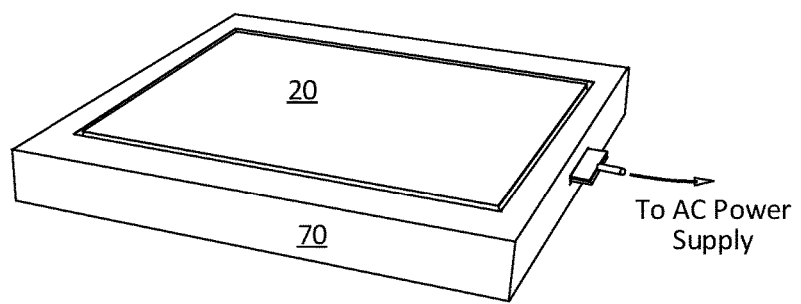
FIG. 22 illustrates an isometric view of a charging station configured in accordance with an embodiment of the present disclosure.

FIG. 22 illustrates an isometric view of a charging station 70 configured in accordance with an embodiment of the present disclosure. Once removed from battery compartment 108, the depleted primary battery 20 may be transferred to external charging device 70 for charging. As can be seen, primary battery 20 may be inserted within charging station 70. Charging station 70 may include a permanent or detachable cable configured to be operatively coupled with a power supply, such as an electrical outlet or other electrical power source. Other suitable configurations for charging station 70 will depend on a given application and will be apparent in light of this disclosure.

In accordance with some embodiments, mobile computing device 10 may include a secondary battery 50 configured to maintain the mobile computing device 10 in a powered-on state, for instance, during replacement of the primary battery 20. Secondary battery 50 may be permanently integrated with device 10, or it may be removable, as with primary battery 20. In any case, secondary battery 50 may provide power to host mobile computing device 10 when primary battery 20 is fully depleted and/or uninstalled from mobile computing device 10, allowing mobile computing device 10 to remain on and operable during the battery replacement process. In replacing a depleted primary battery 20 with a fully (or otherwise) energized primary battery 20, mobile computing device 10 may be, in a general sense, instantly recharged and operable, and the presence of secondary battery 50 may expedite this quick battery change while maintaining device 10 in a functional powered state.

As can be seen further from the figures, mobile computing device 10 may include one or more buttons 114 (e.g., disposed at a side 12 of outer housing 11). A given button 114 may be of any of a wide range of configurations. For instance, a given button 114 may be a physical control feature, such as a physical button, switch, knob, pressure sensor, toggle, slider, and so forth. The present disclosure is not intended to be so limited, however, as in other cases, a given button 114 may be a virtual control feature, such as a touch-sensitive icon or other element providing any one or more of the aforementioned physical control feature functionalities.

In accordance with some embodiments, a given button 114 may be configured, for example, to initiate any of a wide range of functions or commands when pressed by a user in operation of mobile computing device 10. For instance, in some cases, a given button 114 may be configured to dial the phone number of a designated contact (e.g., family member, friend, work associate, etc.) automatically when pressed. In some cases, a given button 114 may be configured to answer incoming phone calls immediately when pressed. In some cases, a given button 114 may be configured (e.g., as with EDC button 40, discussed above) to dial an emergency phone number (e.g., 9-1-1) automatically when pressed. In at least some such instances, mobile computing device 10 may include a safety guard 39 disposed proximate EDC button 40 (or other button 114) and configured to prevent unintentional activation of such a button 40, thereby minimizing or otherwise reducing the risk of inadvertently dialing an emergency services provider or activation of other associated functionality.

In some cases, a given button 114 may be configured to disable/enable access to short message service (SMS) (i.e., text message) capabilities of mobile computing device 10 when pressed. In this manner, a user may press such button 114 to disable access, for example, while driving or operating machinery. Such a button 114 may be configured to either (or both) incoming and outgoing text/SMS. Thereafter, the user may reenable access to text/SMS capabilities when desired by pressing such button 114 once more. In at least some instances, such a button 114 may be considered, in a general sense, a no text-and-drive button. In an example case, in response to receipt of an incoming text/SMS from a remote device, with text/SMS capabilities disabled via a button 114, mobile computing device 10 optionally may transmit automatically to the remote device a message indicating that SMS capabilities are currently disabled and the user of mobile computing device 10 is currently unable to reply because he/she is driving, operating machinery, or otherwise occupied. In accordance with some embodiments, mobile computing device 10 may be configured to log times during which the text/SMS capabilities are disabled. This data may prove useful, for instance, in determining whether a user was using text/SMS on mobile computing device 10 prior to an automobile or workplace accident.

In some cases, a given button 114 may be configured to enable/disable camera 118 instantly when pressed. Such button 114 also may be used to perform an image capture (or record video) via camera 118 when pressed. Camera 118 may be configured as typically done. In some cases, camera 118 may be disposed on the back of mobile computing device 10 and, at least in some instances, centered with respect to the edges of outer housing 11 (e.g., such as is generally shown in FIG. 10). Other suitable configurations for camera 118 will depend on a given application and will be apparent in light of this disclosure.

In accordance with some embodiments, mobile computing device 10 may include one or more externally accessible media slots 112 (e.g., disposed at a side 12 of outer housing 11 and accessible therefrom) configured to allow quick and easy access to storage media inserted therein. In some cases, a given media slot 112 may be configured, for example, to receive and retain a subscriber identification module (SIM)

card. In some cases, a given media slot 112 may be configured, for example, to receive and retain a secure digital (SD) card (e.g., a standard SD card, a mini-SD card, a micro-SD card, etc.). Thus, as will be appreciated in light of this disclosure, this may realize improvements in accessibility and replacement of such storage media for the host mobile computing device 10. Other suitable configurations for media slot(s) 112 will depend on a given application and will be apparent in light of this disclosure.

In accordance with some embodiments, mobile computing device 10 may include an input port 102 configured to receive and retain a power and/or data transfer cable. Input port 102 may be of universal serial bus (USB) configuration or any other suitable standard, custom, or proprietary power and/or data interfacing configuration, as will be apparent in light of this disclosure. Input port 102 may be configured to engage the cable in a locking manner, such that the cable cannot be disengaged from input port 102 without first unlocking them from one another. To this end, input port 102 and may be configured for a bayonet-style connection with the cable, requiring a user to push the cable inward towards input port 102 and twist to lock or unlock their mated engagement. As will be appreciated in light of this disclosure, this type of mated engagement may provide for operative coupling between input port 102 and the cable in a manner more physically robust than existing cable and port interfacing designs for cell phones and other mobile computing devices. At least in some cases, this may allow for reliable and repeatable connection of a cable with mobile computing device 10, realizing improvements in securing and retaining a power/data cable during charging and/or data transfer processes, as compared to existing interfacing approaches. In at least some embodiments, input port 102 may be configured to retain the cable in engagement therewith when replacing primary battery 20 (as described above). Other suitable configurations for input port 102 will depend on a given application and will be apparent in light of this disclosure.

In accordance with some embodiments, mobile computing device 10 may include one or more photovoltaic modules 104 (e.g., solar cells) disposed thereon and configured to convert light energy to electrical energy for use by mobile computing device 10. A given photovoltaic module 104 may be configured as typically done. Photovoltaic module(s) 104 may be operatively coupled with the internal electronics 60 of mobile computing device 10 to provide for any one, or combination, of: (1) electrical charging of primary battery 20; (2) electrical charging of secondary battery 50; and (3) electrical powering of mobile computing device 10. A given photovoltaic module 104 may be located anywhere on mobile computing device 10, and in at least some cases, one or more photovoltaic modules 104 may be disposed on a back and/or front of mobile computing device 10. Other suitable configurations for photovoltaic module(s) 104 will depend on a given application and will be apparent in light of this disclosure.

In accordance with some embodiments, mobile computing device 10 may include one or more scanner devices. A given scanner device may be configured as an optical scanner, a magnetic scanner, or any other suitable scanner type, as will be apparent in light of this disclosure. For instance, in some embodiments, mobile computing device 10 may include a scanner device 122 configured as a payment scanner by which a user may make instant payments via device 10 utilizing the user's personal identification number (PIN) or other unique identifier typically utilized in electronic payments. In an example case, mobile computing device 10 includes a barcode scanner device 116 disposed at an end of outer housing 11, proximate light output device 120 (discussed below). In some embodiments, mobile computing device 10 may include a scanner device 116 configured, for example, as a barcode scanner by which a user may scan barcodes, quick response (QR) codes, or other data, for instance, to check item prices while shopping or access a website via a displayed advertisement. En an example case, mobile computing device 10 includes a payment scanner device 122 disposed on back of outer housing 11, proximate camera 118.

A given scanner device 116, 122 may be configured as typically done. For instance, a given scanner device 116, 122 may be of any suitable type, including, for example, photodiode-based, laser-based, charge-coupled device (CCD)-based, LED-based, and camera-based readers/decoders, to name a few. In some cases, a given scanner device 116, 122 may be configured to read optical elements and, to that end, may include a light source, one or more lenses, and a light sensor configured to translate optical impulses to electrical impulses. In some cases, a given scanner device 116, 122 may be configured to read magnetic elements and, to that end, may include a near field communication (NFC) or other magnetic induction component or a radio frequency (RF) sensing component. In any case, a given scanner device 116, 122 may include or have access to decoder hardware, software, and/or firmware, allowing for analysis of signals and/or data obtained thereby. Other suitable configurations for scanner device(s) 116, 122 will depend on a given application and will be apparent in light of this disclosure.

In accordance with some embodiments, mobile computing device 10 may include one or more light output devices 120 (e.g., such as a flashlight). A given light output device 120 may be configured to emit electromagnetic radiation (e.g., light) from any one, or combination, of spectral bands, such as, for example, the visible spectral band, the infrared (IR) spectral band, and the ultraviolet (UV) spectral band, among others. A given light output device 120 may include a semiconductor light source, such as a light-emitting diode (LED). In an example case, mobile computing device 10 includes a light output device 120 at its end, proximate camera 118. In this example arrangement, light output device 120 may be oriented to provide a light output distribution extending away from the end of mobile computing device 10. Thus, in a general sense, such a light output device 120 may be configured to serve as a flashlight, casting light out in front from an end of mobile computing device 10 in a direction along the length of mobile computing device 10, for example, when grasped by a user. Moreover, such a light output device 120 may serve to illuminate items to be scanned by a given scanner device 116, 122 (discussed above). Other suitable configurations for light output device(s) 120 will depend on a given application and will be apparent in light of this disclosure.

In accordance with some embodiments, mobile computing device 10 may be configured such that certain of its features are not accessible if it is not physically located sufficiently proximate to the authorized user. For instance, features such as any payment scanner capabilities, image playback capabilities, and stored personal information may not work when mobile computing device 10 and the authorized user are physically separated by a sufficient distance. In some instances, mobile computing device 10 may be programmed to lock and/or shut down or go into a sleep state automatically if it is physically separated from the authorized user by a sufficient distance or for a sufficient period. In an example case, the authorized user may wear a bracelet, carry a keycard, or possess some other tangible element that includes security credentials readable by mobile computing device 10 to prevent such lockout and maintain authorized operation of mobile computing device 10.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A mobile computing device comprising:
   an outer housing configured to have disposed therein a first battery and to interface with a second battery configured to serve as an integral portion of the outer housing;
   electronics configured to provide electrical coupling with the first battery and the second battery; and
   a button configured to disable and enable short message service (SMS) capabilities of the mobile computing device upon activation of the button, wherein the button is accessible from an exterior of the outer housing;
   wherein the mobile computing device is configured such that when SMS capabilities are disabled and the mobile computing device receives SMS data from a remote source, the mobile computing device automatically transmits data to the remote source indicating that at least one of:
   (a) SMS capabilities are currently disabled; and
   (b) a user of the mobile computing device is currently unavailable for reply; and
   wherein the mobile computing device is configured such that times during which SMS capabilities are disabled are logged.

2. The mobile computing device of claim 1, further comprising:
   an emergency distress call (EDC) button configured to call an emergency services provider upon activation of the button and at least one of turn on a global positioning system (GPS) element and alert a contact, wherein the EDC button is accessible from an exterior of the outer housing; and
   a safety guard disposed over the EDC button and configured to prevent unintentional activation of the EDC button.

3. The mobile computing device of claim 1, further comprising a button configured to access a camera of the mobile computing device immediately upon activation of the button and capture image data immediately upon activation, wherein the button is accessible from an exterior of the outer housing.

4. The mobile computing device of claim 1, further comprising a media slot accessible from an exterior of the outer housing, wherein the media slot is configured to receive and retain at least one of a subscriber identity module (SIM) card and a secure digital (SD) memory card.

5. The mobile computing device of claim 1, further comprising at least one of:
   a barcode scanner device disposed at an end of the outer housing; and
   a payment scanner device disposed on a back of the outer housing.

6. The mobile computing device of claim 1, further comprising a light output device disposed at an end of the outer housing and configured to cast light out from the end of the outer housing in a direction along a length of the outer housing, wherein the light output device comprises at least one light-emitting diode (LED).

7. The mobile computing device of claim 1, further comprising a photovoltaic cell configured to be electrically coupled with the electronics to provide for at least one of:
   electrical charging of the first battery;
   electrical charging of the second battery; and
   electrical powering of the mobile computing device directly.

8. The mobile computing device of claim 1, wherein the outer housing is configured to permit the second battery to be mounted directly on the outer housing.

9. The mobile computing device of claim 1, wherein the outer housing is configured to permit the second battery to be mounted indirectly on the outer housing via at least one intervening element.

10. The mobile computing device of claim 1, wherein in being configured such that times during which SMS capabilities are disabled are logged, the mobile computing device is configured to output data utilizable in determining whether the user was using SMS capabilities prior to an automobile or workplace accident.

11. The mobile computing device of claim 1, further comprising a battery compartment disposed at least one of on and within the outer housing and configured to receive the second battery.

12. The mobile computing device of claim 11, wherein the outer housing includes a first guidance feature configured to physically guide the second battery into position with respect to the battery compartment.

13. The mobile computing device of claim 12, wherein the second battery includes a second guidance feature complementary to the first guidance feature.

14. The mobile computing device of claim 13, wherein at least one of the first guidance feature and the second guidance feature comprises either a protruding lip or a recessed channel configured to permit the second battery to slide into position with respect to the battery compartment.

15. The mobile computing device of claim 11, wherein the outer housing is configured such that the second battery, when disposed within the battery compartment, is co-planar with an exterior surface of the outer housing.

16. The mobile computing device of claim 15, wherein the outer housing is configured such that the second battery, when disposed within the battery compartment, occupies a full width of the outer housing.

17. The mobile computing device of claim 15, wherein the outer housing is configured such that the second battery, when disposed within the battery compartment, occupies less than a full width of the outer housing.

18. The mobile computing device of claim 11, further comprising a battery replacement mechanism configured to provide for removal of the second battery from the battery compartment, wherein the battery replacement mechanism comprises the outer housing being configured to permit the second battery to be mounted on the outer housing and to at least one of slide into the battery compartment and snap onto the battery compartment.

19. The mobile computing device of claim 11, wherein the electronics are configured to provide electrical coupling of the first battery and the second battery in parallel such that, upon removal of the second battery from the battery compartment, the mobile computing device draws power from the first battery.

* * * * *